United States Patent [19]
Bonevento et al.

[11] Patent Number: 5,170,471
[45] Date of Patent: Dec. 8, 1992

[54] COMMAND DELIVERY FOR A COMPUTING SYSTEM FOR TRANSFERRING DATA BETWEEN A HOST AND SUBSYSTEMS WITH BUSY AND RESET INDICATION

[75] Inventors: Francis M. Bonevento, Boca Raton; Douglas R. Chrisholm, Delray Beach; Sammy D. Dodds, Pompany Beach; Dhruvkumar M. Desai; Ernest N. Mandese, both of Boynton Beach; Andrew B. McNeill, Deerfield Beach; Richard N. Mendelson, Highland Beach, all of Fla.

[73] Assignee: International Business Machines Corporation, Armonk, N.Y.

[21] Appl. No.: 818,654

[22] Filed: Jan. 6, 1992

Related U.S. Application Data

[62] Division of Ser. No. 364,931, Jun. 9, 1989, Pat. No. 5,131,082.

[51] Int. Cl.⁵ .............................................. G06F 13/14
[52] U.S. Cl. .................................. 395/275; 364/238.3; 364/DIG. 1
[58] Field of Search ........................................ 395/275

[56] References Cited

U.S. PATENT DOCUMENTS

| | | | |
|---|---|---|---|
| 3,778,780 | 12/1973 | Moore | 395/650 |
| 3,787,891 | 1/1974 | Moore et al. | 395/200 |
| 4,445,176 | 4/1984 | Burk et al. | 395/200 |
| 4,553,202 | 11/1985 | Trufyn | 395/725 |
| 4,653,020 | 3/1987 | Cheselka et al. | 395/157 |
| 4,855,949 | 8/1989 | Garland et al. | 395/129 |

Primary Examiner—Lawrence E. Anderson
Attorney, Agent, or Firm—Jack M. Arnold

[57] ABSTRACT

A Command interface includes ports for transferring information between a host processor and at least one intelligent subsystem which may have attached devices. A Command Interface port receives either a direct command or an indirect command from the host processor, which commands are indicative of a type of operation to be performed by the one subsystem or an attached device. An Attention port receives a code from the host processor which is indicative of which one of the direct command or the indirect command is received at the Command Interface port, and which is also indicative of which of the one intelligent subsystem or a device is to execute the command. A command busy/status port receives a code from the one intelligent subsystem which is indicative of whether or not the Command Interface port and the Attention port are busy, and whether or not the one intelligent subsystem is accepting or rejecting commands. The host processor can read this port without altering or updating the code.

1 Claim, 30 Drawing Sheets

MICRO CHANNEL INTERFACE

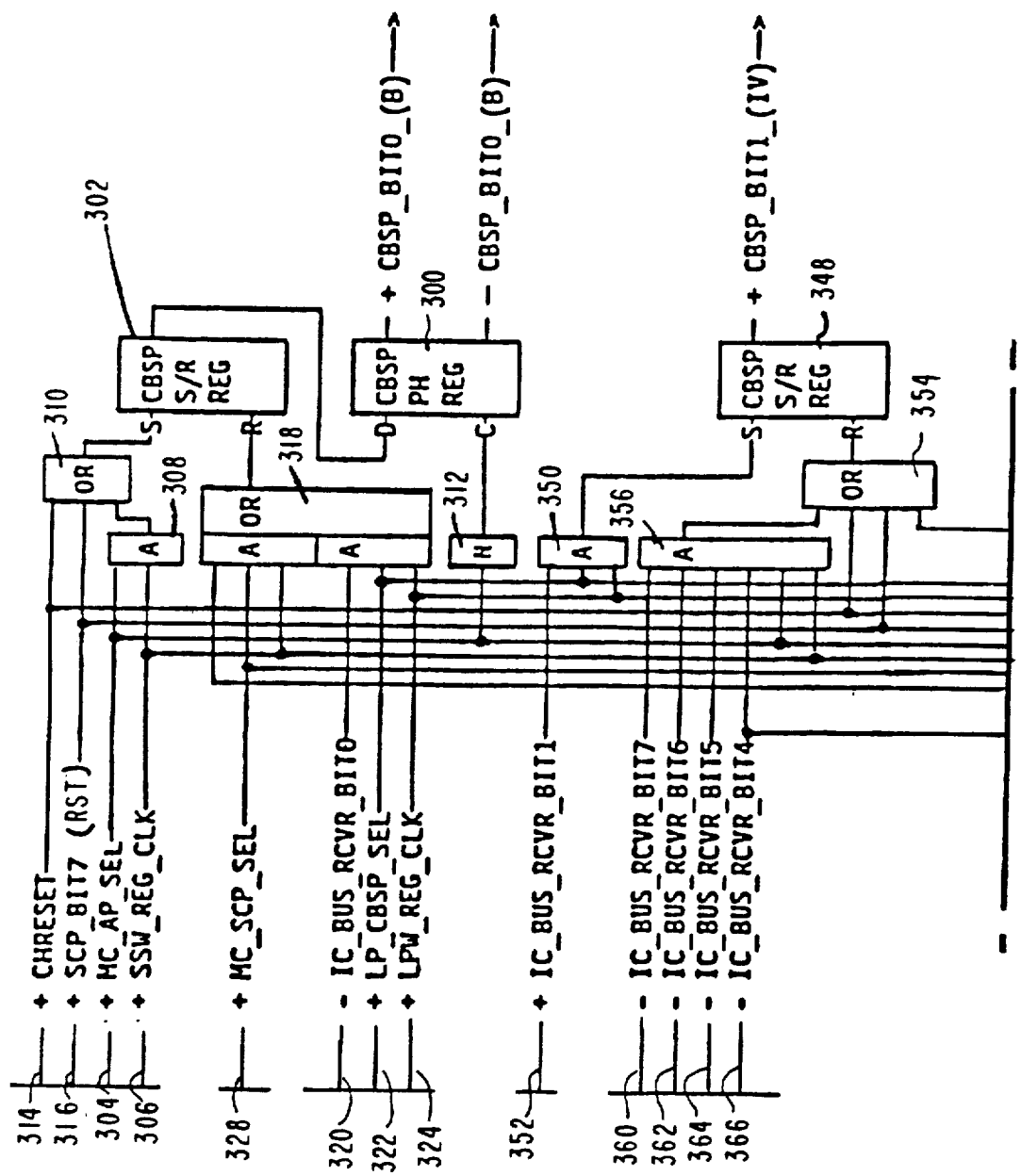

FIG. 6
COMMAND INTERFACE PORT FORMAT
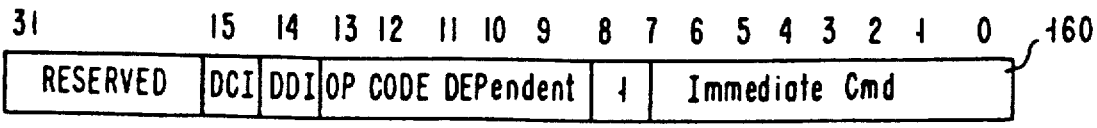
IMMEDIATE COMMAND FORMAT TYPE 1
(OR)
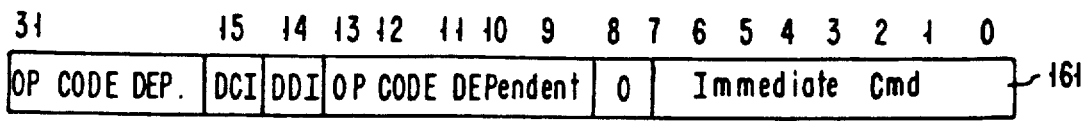
IMMEDIATE COMMAND FORMAT TYPE 2
ATTENTION PORT FORMAT
RESET DEVICE COMMAND TYPE
(OR)
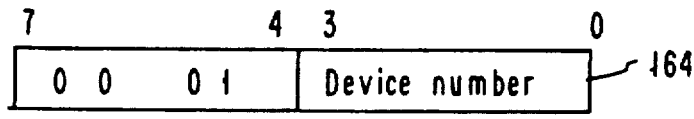
IMMEDIATE COMMAND (COMMAND TYPE)
(OR)
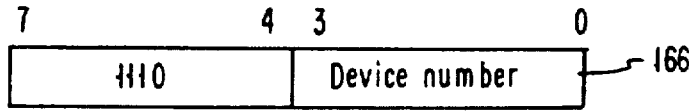
RESET INTERRUPT (EOI) COMMAND TYPE
FIG. 7
COMMAND INTERFACE PORT FORMAT
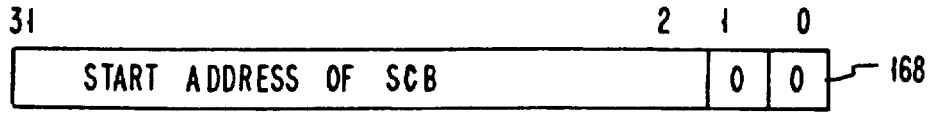
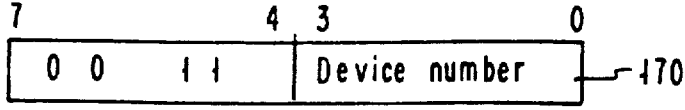

FIG. 14

| Current State | OUT to SSCP set RST | Out to SSCP set EI or DMA | Out to SSCP set bits 6,4,3,2 | Out to Command Port | Out to Attention Port | Out to SSCP set RR |
|---|---|---|---|---|---|---|
| ACCEPT | RST set. Note 1. | EI or DMA set. Note 2 | Bits set in SSCP. Note 2 | Command port set. | Attention port set. Note 3 | RR set. Note 2 |
| PENDS | RST set. | Ignore. Set to 0. | Ignore. Set to 0. | Ignore. Set to 0. | Ignore. Set to 0. | Ignore. Set to 0. |
| PENDC | RST set. Note 4. | Ignore. Set to 0. | Ignore. Set to 0. | Ignore. Set to 0. | Ignore. Set to 0. | Ignore. Set to 0. |
| RESETS | RST set. Note 1. | EI or DMA set. Note 2. | Bits set in SSCP. Note 2. | Ignore. Set to 0. | Ignore. Set to 0. | RR set. Note 2. |
| DECODE | RST set. Note 1. | Ignore. Values unchanged. Note 2. | Ignore. Values unchanged. Note 2. | Ignore. Value unchanged. | Ignore. Value unchanged. | Ignore. Value unchanged. Note 2. |
| REJECT | RST set. Note 1 | EI or DMA Set. Note 2. | Bits set in SSCP. Note 2. | Ignore. Value unchanged. | Ignore. Value unchanged. | RR set. Note 5. |

FIG. 15

DECISION TABLE 1: ACCEPTING COMMANDS IN THE DECODE PROCESS

| New Command or Attention Code | Device Number Valid | Device Avail | Valid 8 Bit Immed Op | Busy State | Busy Sub-state | Int Queue Full | SCB Exec Enable |
|---|---|---|---|---|---|---|---|
| Reset Dev or Reset Subsystem | YES | DC | YES | DC | DC | DC | DC |
| Reset Int Stat Port | YES | YES | YES | IDLE | NA | DC | DC |
| SCB Cmd or Device Dependent Attention as SCB | YES | YES | NA | IDLE | NA | NO | YES |
| Immed Cmd not Suspend, Reset Dev Reset Subsystem Reset SCB Int., Reset Int Stat Port | YES | YES | YES | IDLE | NA | NO | NA |
| Reset SCB Interrupt | YES | YES | YES | IDLE | NA | DC | DC |
| Reset SCB Interrupt | YES | YES | YES | BUSY | SCB | DC | YES |
| Suspend | YES | YES | YES | BUSY | SCB | NO | DC |
| Suspend | YES | YES | YES | IDLE | NA | NO | DC |

FIG. 16

DECISION TABLE 2: REJECTING COMMANDS IN THE
DECODE PROCESS. **** = REASON FOR REJECTION

| New Command or Attention Code | Device Number Valid | Device Avail | Valid 8 Bit Immed Op | Busy State | Busy Sub-state | Int Queue Full | SCB Exec Enable | Reject Code set by Decode |
|---|---|---|---|---|---|---|---|---|
| Reset Device | DC | DC | NO **** | DC | DC | DC | DC | Invalid Command |
| Reset Device | DC | DC | YES | DC | DC | DC | DC | Invalid Command |
| Reset Device | DC | DC | YES | DC | DC | DC | DC | Invalid Command |
| Reset Device | NO **** | DC | YES | DC | DC | DC | DC | Invalid Dev Number |
| Invalid Attention Code **** | DC | DC | DC | DC | DC | DC | DC | Invalid Command |
| Valid Attention not SCB or Device Dependent Attention as SCB or Reset Dev | DC | DC | NO **** | DC | DC | DC | DC | Invalid Command |
| Valid Attention not SCB or Device Dependent Attention as SCB or Reset Dev | DC | DC | YES | DC | DC | DC | DC | Invalid Command |

FIG. 17

DECISION TABLE 2 (PART 2): REJECTING COMMANDS IN
THE DECODE PROCESS.= **** = REASON FOR REJECTION

| New Command or Attention Code | Device Number Valid | Device Avail | Valid 8 Bit Immed Op | Busy State | Busy Sub-state | Int Queue Full | SCB Exec Enable | Reject Code set by Decode |
|---|---|---|---|---|---|---|---|---|
| Valid Attention not Reset | NO **** | DC | YES if not SCB | DC | DC | DC | DC | Invalid Device Number |
| Valid Attention not Reset | YES | NO **** | YES if not SCB | DC | DC | DC | DC | Device Unavailable |
| Any Cmd except Suspend, Reset Dev Reset SCB Interrupt | YES | YES | YES if not SCB | YES | BUSY **** | DC | DC | Device Busy |
| Suspend or Reset SCB Interrupt | YES | YES | YES | BUSY | NOT SCB **** | DC | DC | Device Busy |
| SCB or Device Dependent Attention as SCB | YES | YES | NA | IDLE | NA | YES **** | DC | Interrupt Queue Full |
| Suspend | YES | YES | YES | IDLE | NA | YES **** | DC | Interrupt Queue Full |
| Suspend | YES | YES | YES | BUSY | SCB | YES **** | DC | Interrupt Queue Full |

FIG. 18

DECISION TABLE 2(PART 3): REJECTING COMMANDS IN THE DECODE PROCESS. REASON FOR REJECTION

| New Command or Attention Code | Device Number Valid | Device Avail | Valid 8 Bit Immed Op | Busy State | Busy Sub-state | Int Queue Full | SCB Exec Enable | Reject Code set by Decode |
|---|---|---|---|---|---|---|---|---|
| Immediate Cmd not Reset Dev Reset SCB Interrupt Suspend, Reset Int Stat Port | YES | YES | YES | IDLE | NA | YES **** | NA | Interrupt Queue Full |
| SCB or Device Attention as SCB | YES | YES | NA | IDLE | NA | NO | NO **** | Exec Suspended |

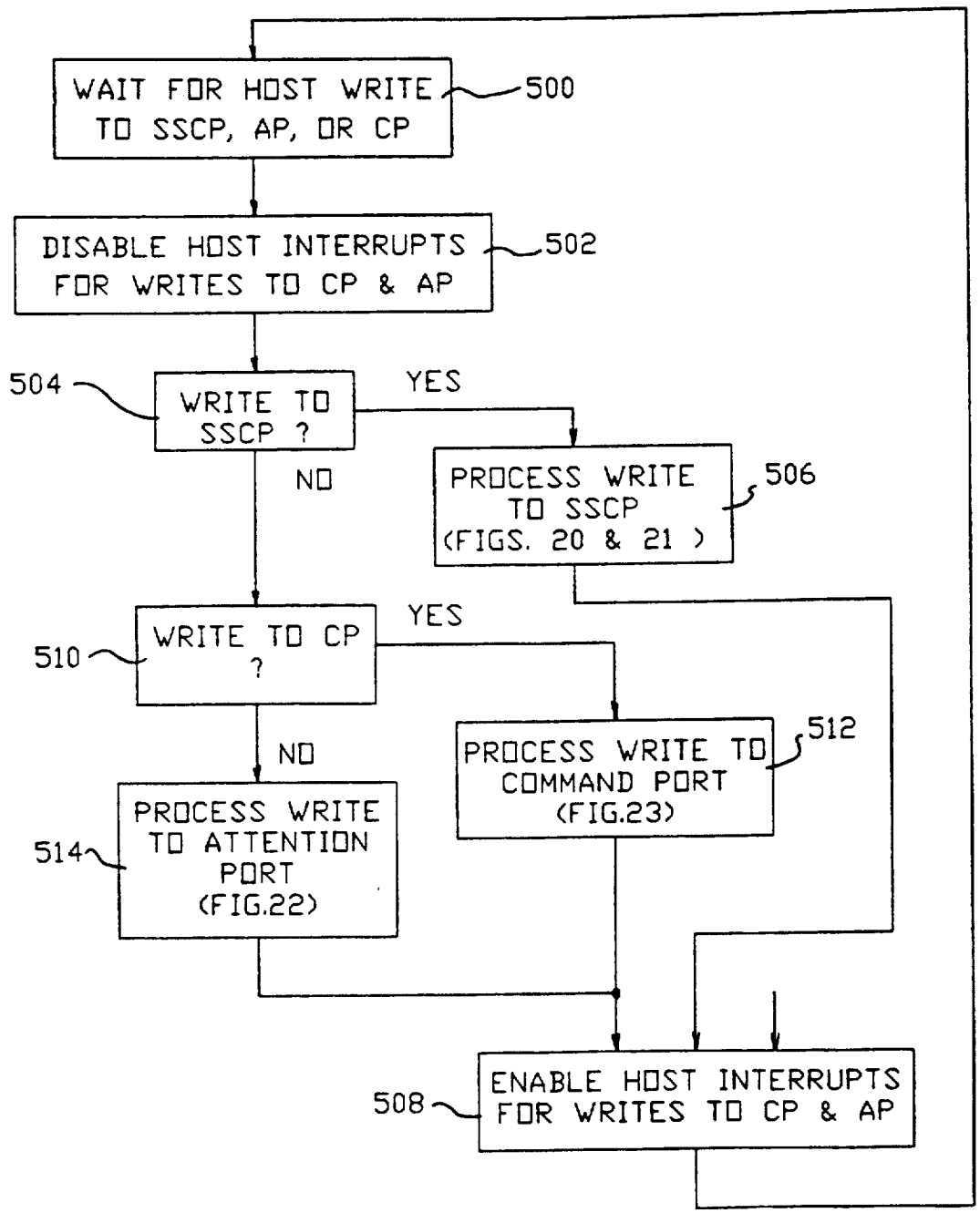

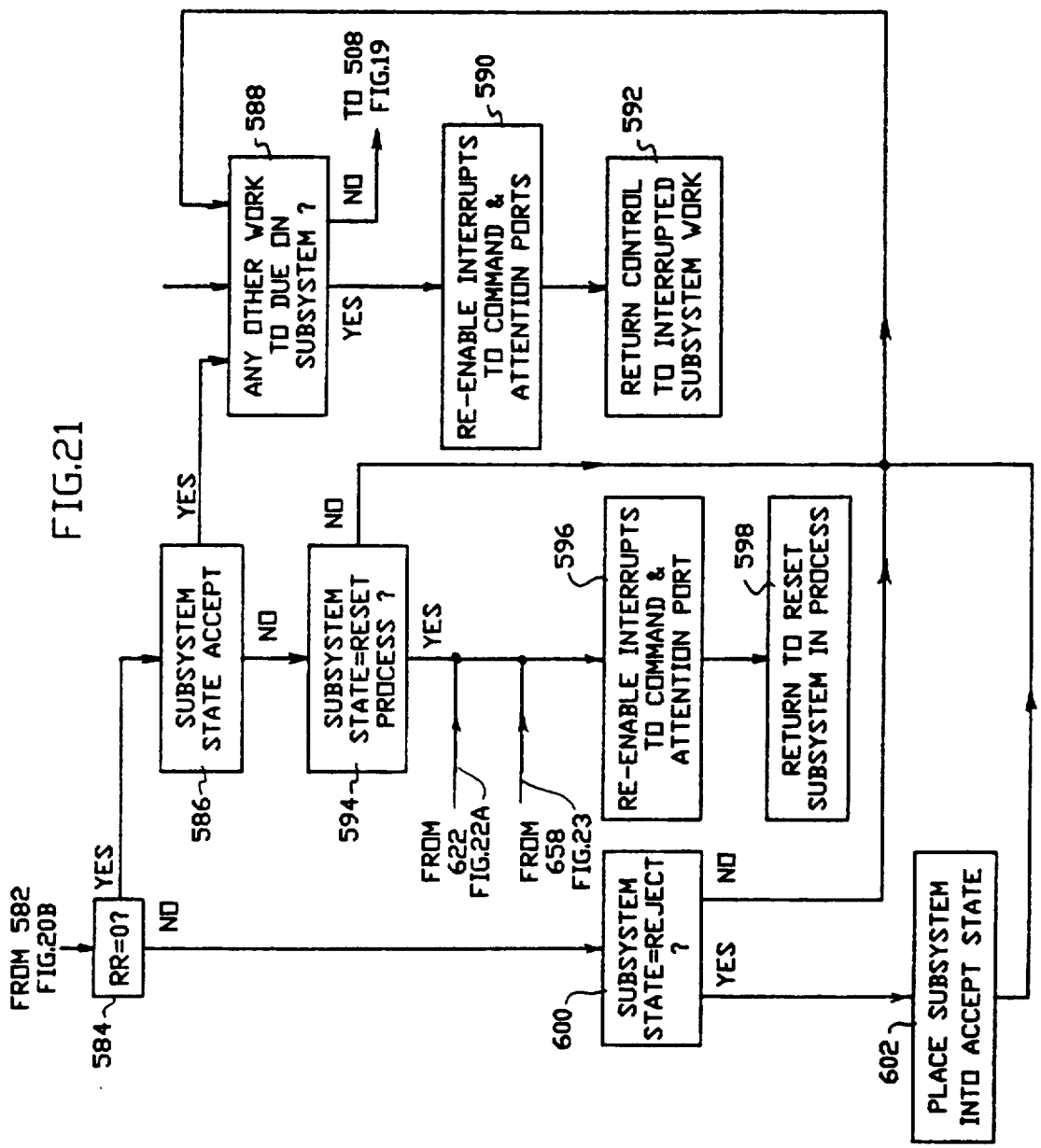

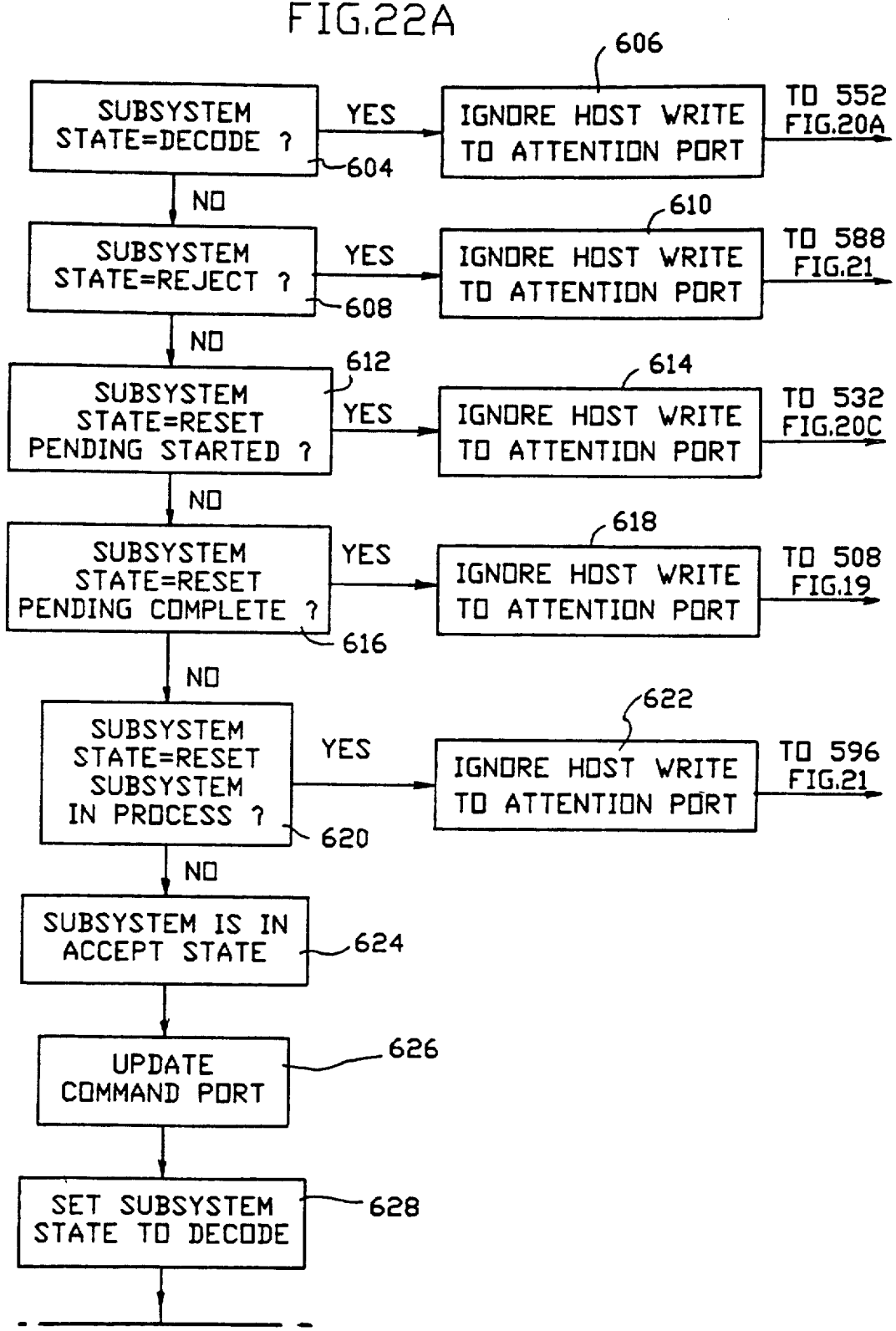

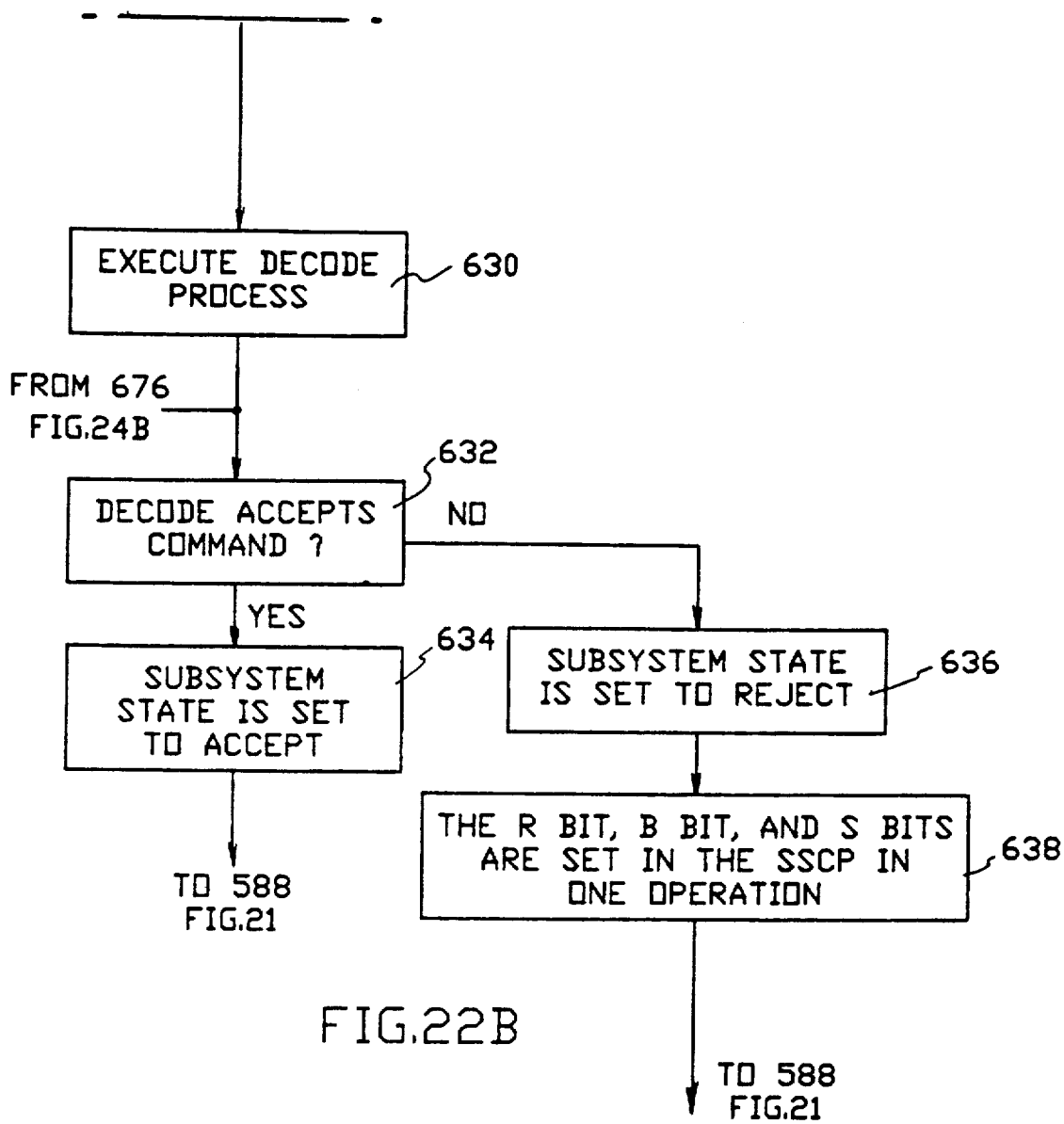

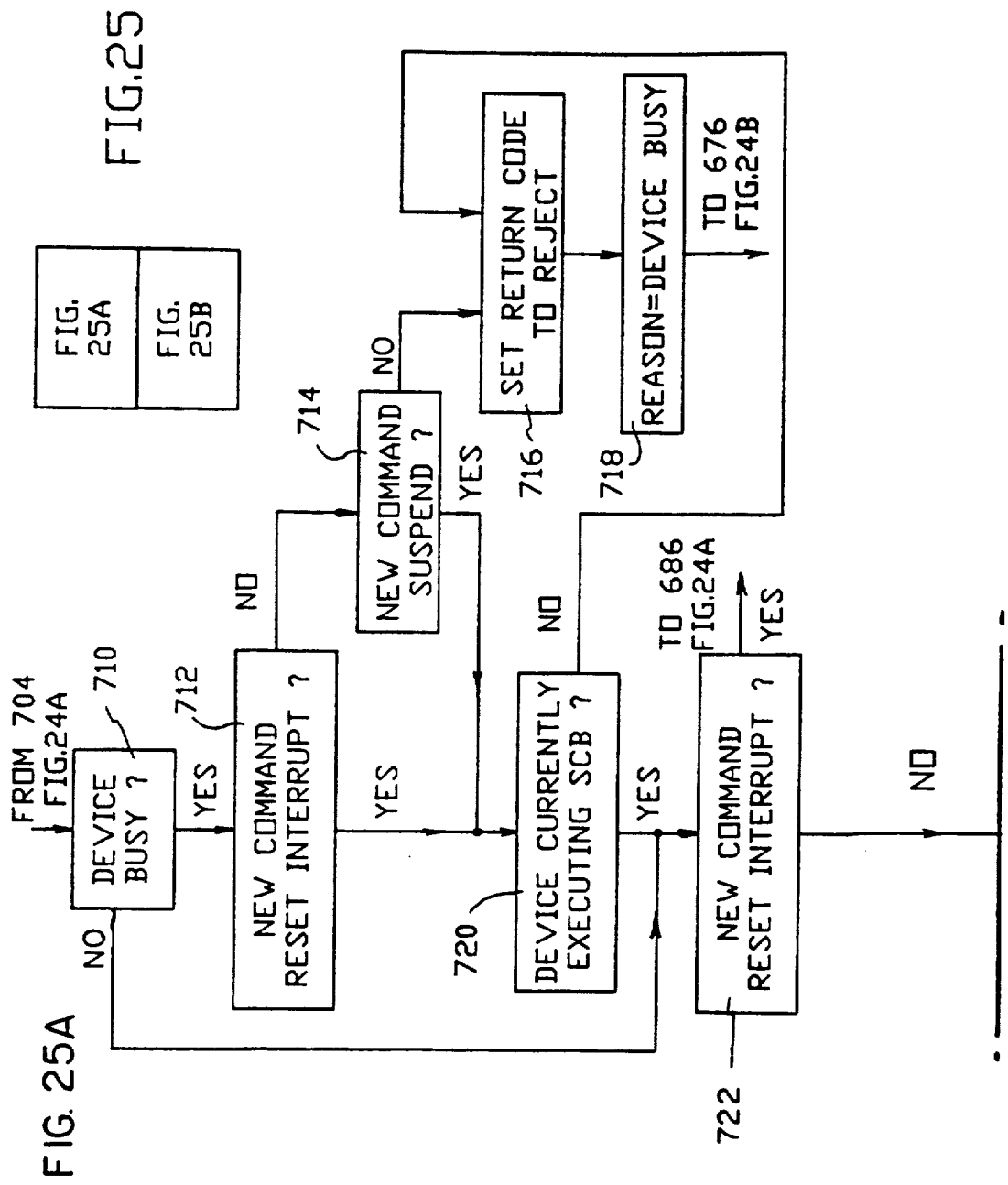

COMMAND DELIVERY FOR A COMPUTING SYSTEM FOR TRANSFERRING DATA BETWEEN A HOST AND SUBSYSTEMS WITH BUSY AND RESET INDICATION

This is a division of application Ser. No. 07/364,931, filed Jun. 9, 1989, now U.S. Pat. No. 5,131,082.

FIELD OF THE INVENTION

The invention is in the field of computing systems, and in particular is directed to a command delivery mechanism. Specifically, the invention is directed to delivering commands from a personal computer class machine to a plurality of intelligent subsystems which may have attached devices.

CROSS REFERENCE TO RELATED APPLICATIONS

Reference is made to U. S. patent application Ser. No. 07/367,391, filed on Jun. 16, 1989, which is entitled "Interrupt Handling For a Computing System", which application is assigned to the assignee of this patent application, and which describes an interrupt handling mechanism which may be utilized in the command delivery system of the instant application.

BACKGROUND OF THE INVENTION

In a data processing or computing system comprised of a host system and at least one subsystem, there is a need to communicate direct and indirect commands to an individual subsystem, usually over an I/0 channel.

The direct command is one which can be directly sent to a subsystem in one operation, is completely and totally self-contained, and totally specifies an operation to be executed, by the subsystem. On the other hand, an indirect command is one which requires more data to specify the operation than can be provided within one channel I/O cycle. The indirect command is itself a pointer to a block of system memory which contains all the parameters necessary to totally specify an operation to be performed by the subsystem. This block of memory is often referred to as a "control block".

In all computer systems, there exists at least one I/O instruction which enables the program running in the host system to send data and/or commands over its external interface or channel. The amount of data that can be sent with each I/O operation, as well as the status received from the channel or subsystem relative to the acceptance or completion of the operation is system dependent.

In computers of the class typified by the IBM Series/1, the operation of which is described in "Series/1 Principles of Operation", IBM publication order number GA34-0152-0, every I/O Operation transferred the following information to peripheral attachment cards installed in the Series/1 I/O channel:

(1) The address of the subsystem to which the command is directed.
(2) An 8-bit command field that indicated whether the operation was direct or indirect.
(3) A 16-bit data word which either contained data with respect to a direct command, or an address of a device control block (DCB) in the case of an indirect command.

In addition, during execution of each I/O instruction Cycle on the channel, status was presented through various indicators to record a condition code specifying the status of the I/O operation. This immediate, realtime status allowed the host program to determine whether the command was accepted by the subsystem successfully, or whether an error condition occurred such as "Device Not Attached" or "Immediate Command Reject". In the case of an error, the host program could retry the command at a later time.

Because the Series/1 subsystems could immediately accept or reject an I/O command, there was no need to use a priority interrupt or other mechanism to report immediate status to the host program.

In order to ensure the integrity of an entire system, there must always be a mechanism to report whether or not an I/O command is accepted for execution by the subsystem. The host system cannot assume that a command is successfully accepted by the subsystem because there are many modes of failure which could remain undetected and therefore unrecoverable.

The need to have complex commands on a personal computer class machine is indicated by the growing complexities of the I/O subsystems that are utilized in state-of-the-art computing systems.

According to the present invention, this need is met by providing a mechanism to transmit commands in the form of subsystem Control Blocks (SCB's) between a host system and a plurality of subsystems. Rather than having a unique processor instruction for delivery of the address field and command type fields as in the Series/1, these fields are provided to a single port, called an attention port to accommodate the present instruction set of common Intel 80286/386/486 base processor systems. It is to be appreciated that other processor based systems may be utilized in the practice of the invention. A command interface port receives direct or indirect commands.

Also, as in the Series/1 type machine, a mechanism did not exist in the personal computer class machines for reporting immediate status when communicating direct or indirect commands across the I/O channel. This need is met by providing a Command Busy/Status Port within each subsystem to provide status of a previous I/O operation, as well as providing the current state of the subsystem. This port can be read by the host program using an I/O read command which does not alter or update the status in this port. Only output (write) commands directed to other ports within a subsystem affect the status in the Command Busy/Status Port.

OBJECTS OF THE INVENTION

It is an object of the invention to provide a command delivery mechanism for a computing system.

It is also an object of the invention to provide a computing system wherein a host system provides direct and indirect commands to at least one subsystem which may have attached devices.

It is another object of the invention to provide a computing system wherein a host processor provides an immediate command or the address of a subsystem control block (SCB) to at least one subsystem which may have attached devices, and the one subsystem executes the immediate command or fetches the SCB for subsequent execution.

It is a further object of the invention to provide a computing system wherein a command interface transfers information between a host processor and at least one intelligent subsystem, which may have a plurality of attached devices. The command interface includes a command interface port which receives either an immediate command or the address of a SCB stored in a system memory, and an attention port which receives a code from the host processor which is indicative of which one of the immediate command or the address of the SCB is received at the command interface port, and which is also indicative of which of the one intelligent subsystem or a device is to execute the command. An initial command and an initial code are locked in the command interface port and the attention port, respectively, such that a subsequent command and code can't overwrite the respective ports until the initial command is processed.

It is yet another object of the invention to provide a computing system wherein a command interface transfers information between a host processor and at least one intelligent subsystem which may have attached devices. The command interface includes a command interface port, an attention port and a command busy/status port. The command interface port receives either an immediate command or the address of an SCB stored in system memory. The attention port receives a code from the host processor which is indicative of which one of the immediate command or the address of the SCB is received at the command interface port, and which is also indicative of which of the one intelligent subsystem or a device is to execute the command. The command busy/status port receives a code from the one subsystem which is indicative of whether or not the command interface port and the attention port are busy, and whether or not the one intelligent subsystem is accepting or rejecting commands. This port can be read by the host processor without altering or updating the status of the port.

It is yet a further object of the invention to provide a computing system wherein a command interface transfers information between a host processor and at least one intelligent subsystem which may have attached devices. The command interface includes a command interface port and an attention port. The command interface port receives either an immediate command or the address of a SCB stored in system memory. The attention port receives a code from the host processor which is indicative of which one of the immediate command or the address of the SCB is received at the command interface port, and which is also indicative of which of the one intelligent subsystem or a device is to execute the command. SCB commands may be chained in a specific order, and are treated as one logical request. The chaining of SCB commands allows the intelligent subsystem to fetch and execute commands, without causing undue interfacing with host processor operation. There may also be chaining of multiple data buffers for a given command. The chain of buffers is structured using an indirect list. Each SCB includes the address of a Termination Status Block (TSB) in system memory, to which the subsystem which is processing the SCB stores completion or termination status for the SCB.

SUMMARY OF THE INVENTION

The invention is directed to a command interface including ports for transferring information between a host processor and at least one intelligent subsystem which may have attached devices. A command interface port receives from the host processor either a direct command which contains all the information necessary for an intelligent subsystem to immediately execute the command, or an indirect command which is the address of a subsystem control block (SCB) stored at one of the addressable locations of the system memory of the host processor. An attention port receives from the host processor a code having a first portion which is indicative of which of the direct command or the indirect command is received at the command interface port, and a second portion which is indicative of which of the one intelligent subsystem or an attached device is to execute the command. A command busy/status port contains status information which can be read by the host processor, which information reflects immediate acceptance or rejection of a command by the subsystem or attached device for subsequent execution. A direct command is directly executed by the one intelligent subsystem or an attached device in accordance with the second portion of the code written in the attention port. If there is an indirect command, the one intelligent subsystem directly accesses the system memory at the indicated SCB address. The one intelligent subsystem or a device then performs the operation indicated in the accessed SCB.

BRIEF DESCRIPTION OF THE DRAWINGS

FIG. 6 illustrates the Command interface port and Attention port general formats for an immediate command;

FIG. 7 illustrates the Command interface port and Attention port general formats for a Subsystem Control Block (SCB) command;

FIG. 14 is a decision table indicative of the results of host processor attempts to set I/O ports;

FIG. 15 is a decision table indicative of accepting commands in the decode process;

FIG. 16, 17 and 18 are decision tables indicative of rejecting commands in the decode process;

FIG. 19 is a flow chart of the command delivery system of the invention;

FIGS. 22A and 22B taken together as shown in FIG. 22 are detailed flow charts of the process write to the attention port, which is shown generally in FIG. 19;

DESCRIPTION OF THE PREFERRED EMBODIMENT

The invention is directed in general to a command delivery system for a program running on a host computer system. Direct or indirect commands are delivered via a command interface to at least one intelligent subsystem, which may have a plurality of attached devices. For purposes of description, the invention is described in the context of a command delivery system for a program running on an IBM Personal System/2 (PS/2) computer. Personal System 2 and PS/2 are each registered trademarks of IBM Corporation. Direct commands, such as immediate commands, and indirect commands, such as addresses of subsystem control blocks stored in the PS/2 system memory, are delivered via the IBM Micro Channel, Micro Channel is a registered trademark of IBM Corporation, to a command, interface on the one intelligent subsystem, which may have a plurality of attached devices such as tape drives, disk drives, printers, communication devices, display devices and the like. It is to be appreciated, however, that the invention may be practiced on other host computer systems delivering commands to intelligent subsystems via an interface network.

A subsystem Control Block (SCB) architecture is defined to provide a control block level of interface between a host processor and subsystems having a Direct Memory Access (DMA) capability, and having the ability to handle command level operations. Individual commands are contained within an SCB. There is command chaining, wherein one SCB points to the address of one or more other SCB's, with this chain being treated as one logical command. There is also data chaining of multiple buffers associated with a given command. The chain of buffers is structured using an indirect list.

A SCB includes the address of a Termination Status Block (TSB) in system memory. The completion or termination status of a given SCB is placed in the TSB by the subsystem processing the command. In order to handle termination at any point in a chain of commands, there is a TSB defined for each SCB in a chain.

Detailed descriptions of the SCB and TSB follow the general description of the command delivery system set forth below.

Figure 1:
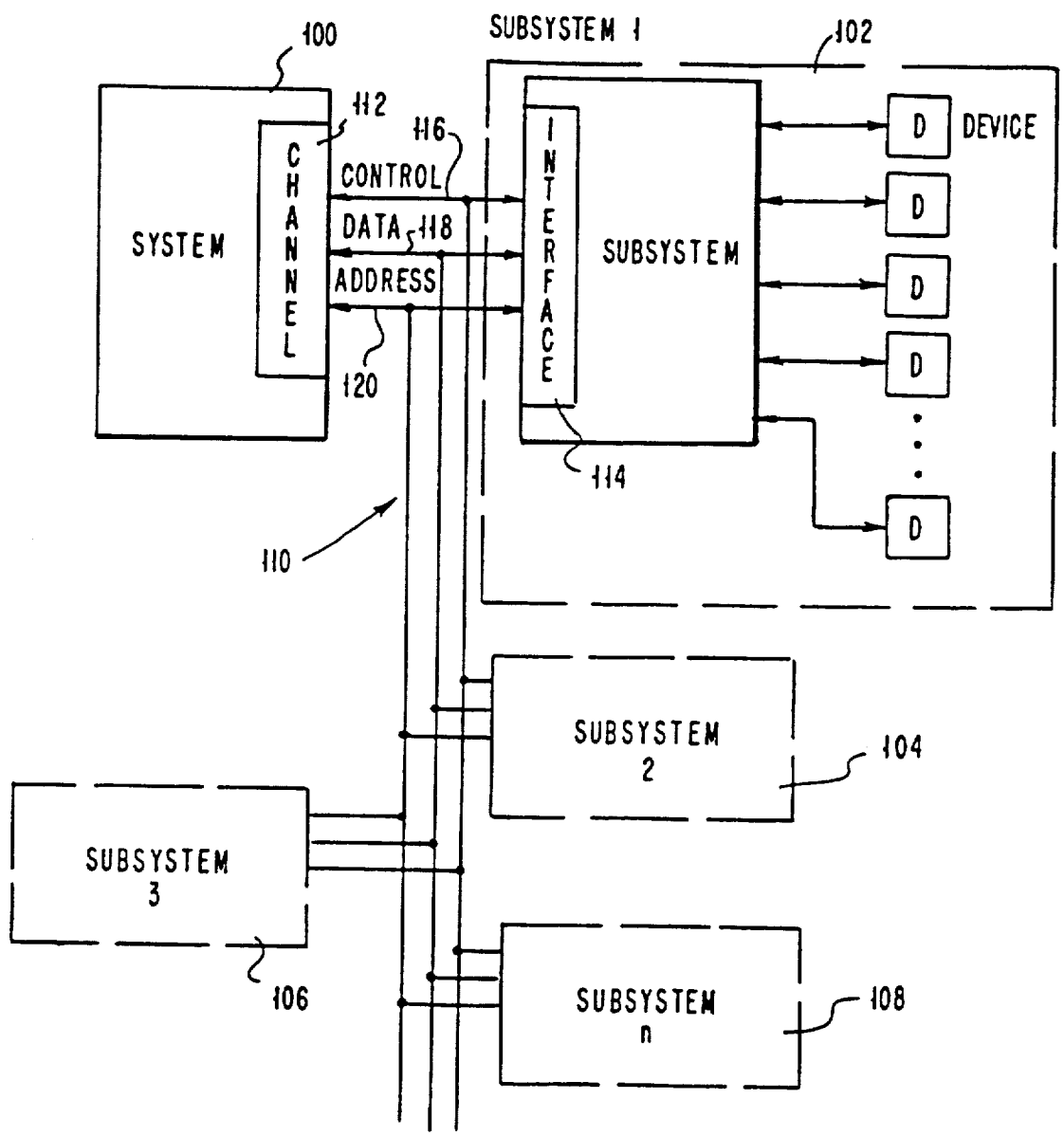
FIG. 1 is a block diagram of a computing system including a host system connected to a plurality of intelligent subsystems, which may have a plurality of devices connected to each subsystem.

Refer now to FIG. 1 which is a general block diagram of a computing system according to the invention. A host computer system 1? 0 exchanges information with a plurality of intelligent subsystems 102, 104, 106 and 108 Via a bus architecture 110. The bus architecture 110 is connected between a channel 112 on the host computer system 110 and an interface on each subsystem, such as the interface 114 in subsystem 102. Each of the subsystems 104, 106 and 108 are similar to subsystem 102. The bus architecture includes a control bus 116 for exchanging control signals, a data bus 118 for exchanging data signals and an address bus 120 for exchanging addresses.

Figure 2:
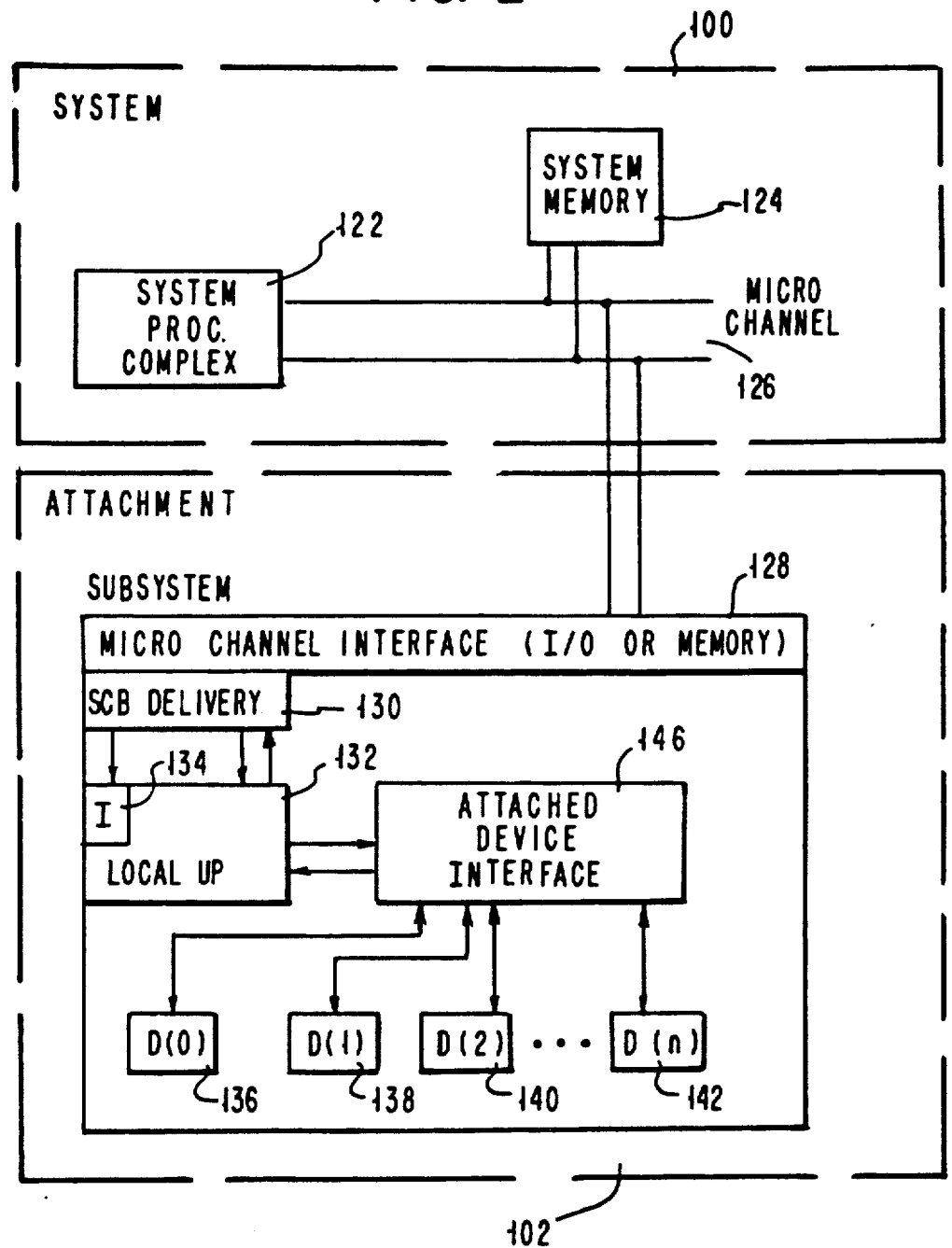
FIG. 2 is a block diagram detailing the host system and one of the intelligent subsystem.

FIG. 2 sets forth details of the system 100 and the subsystem 102, with the understanding that the other subsystems are configured in a like manner.

The host system 100 includes a system processor complex or host processor 122 which is connected to a system memory 124 via a bus 126. The system processor complex 122 consists of a personal computer class microprocessor such as the referenced PS/2 connected by the Micro Channel 126 to the system memory 124. The operation of the PS/2 and the Micro Channel are described in "PS/2 Hardware Interface Technical Reference", IBM Publication order number 68X-2330-0. The memory 124 is accessible by the host processor 122, or the subsystem 102 by direct memory access.

The subsystem 102 is comprised of an attachment or adapter which includes a Micro Channel interface 128 to the Micro Channel 126. The interface includes a set of input/output (I/O) ports, the details of which are described relative to FIG. 3, which allows the system host processor to direct commands to, and receive replies from the subsystem. These ports may be mapped into the system memory space or I/O space. This interface also provides the Micro Channel bus master and/or slave functions needed by the adapter.

The commands include direct or immediate commands and indirect commands such as addresses of Subsystem Control block (SCB's) in the system memory 124. A SCB delivery support logic 130 provides the SCB Commands to a local microprocessor 132, such as an Intel 80186 or 80188 class microprocessor, the operation of which is described in the "Intel Microprocessor and Peripheral Handbook", for processing. SCB delivery 130 also provides local processor interrupts to interrupt logic 134 in processor 132. Detailed flow charts are set forth in FIGS. 17-23 to explain the function of the command handler and decode processor functions included in the SCB delivery logic 130 and microprocessor 132.

The microprocessor 132 responds to the SCB commands to schedule tasks for attached devices 136, 138, 140 and 142 via attached device interface 146, which for example may be the Small Computer System Interface (SCSI). The operation of the SCSI Interface is described in "American National Standards Institute (ANSI) For Information Systems-Small Computer Systems Interface (SCSI)", publication number ANSI X3.131-1986. The attached devices may be disk drives, tape drives, direct access memory devices (DASD's), printers, displays and the like. Device D(0) 136 is utilized to direct commands to the subsystem. The intelligent subsystem 136 and the devices 138, 140 and 142 are each viewed as a logical device by the host processor, with each being assigned a device identification number, D(0), D(1), D(2) and D(n), respectively, by which they are addressed.

Figure 3:
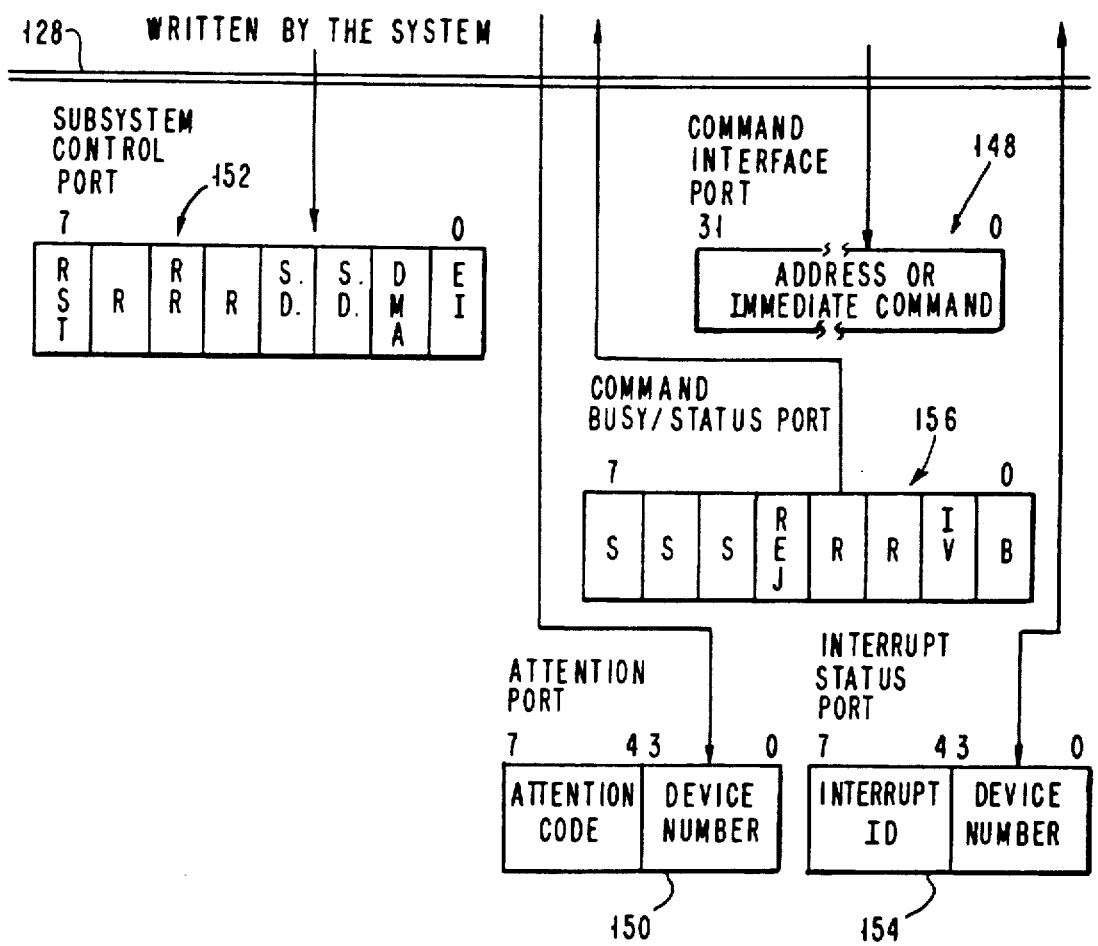
FIG. 3 is a block diagram of the Command interface for exchanging information between the host system and an intelligent subsystem.

The I/O ports of the Micro Channel interface 128 are illustrated in FIG. 3. The ports defined to control a subsystem must be allocated in I/O address space in the following order:

(1) A Command Interface Port 148.

(2) An Attention Port 150.

(3) A Subsystem Control Port 152.

(4) An Interrupt Status Port 154.

(5) A Command Status/Busy Port 156.

These ports can be mapped into system memory address space instead of the I/O address space. For purposes of description, I/O addresses were chosen. Therefore, where an "OUT" or an "IN" command is used in the description, a "System Write" or "System Read" command would be substituted if the ports are mapped to system memory address space.

The Command Interface Port 148, which may also be referred to as the Command Port, is a subsystem read/system write register. This 32-bit register is used to transfer a two word (32-bit) Direct, that is an Immediate Command, or an Indirect Command such as the SCB address from the system to the subsystem. The Immediate Command or SCB specifies the operation to be performed by the subsystem.

The system program writes an immediate command or an SCB address to the Command Interface Port 148 then writes the Attention Port 150. The subsystem sets the busy bit in the Command Busy/Status Port 156. When the system has written the Attention Port 150 this signals the local microprocessor 132 via the interrupt 134 (FIG. 2). Responding to the interrupt, the subsystem reads the Attention and Command Interface Ports, then determines the type of operation to be performed, and the device it is directed to. The subsystem will either fetch the SCB at the address provided in the Command Interface Port or execute the Immediate Command.

The Attention Port 150 is a subsystem read/system write register. This 8 or 16 bit register is used by the system program to request the attention of the Subsystem to perform a command. The bits in the register indicate the requested action and the associated device number. Stated another way, the Attention port receives a code having a first portion which is indicative of which one of the immediate command or SCB address is received at the command interface Port 148, and a second portion which is indicative of which one of the subsystem or an attached device is to execute the command received at the command interface Port 148. When the Attention Port 150 is written by the system, the Busy bit in the Command Busy/Status Port 156 is immediately set to ONE by the subsystem. The Busy bit remains set until the subsystem reads the attention request and the associated Command Interface Port, and determines if it can accept the command. The subsystem must be able to receive new commands at any time the Busy bit is ZERO. The Busy bit will also remain set until the subsystem has completed a Reset Subsystem.

Figure 4:
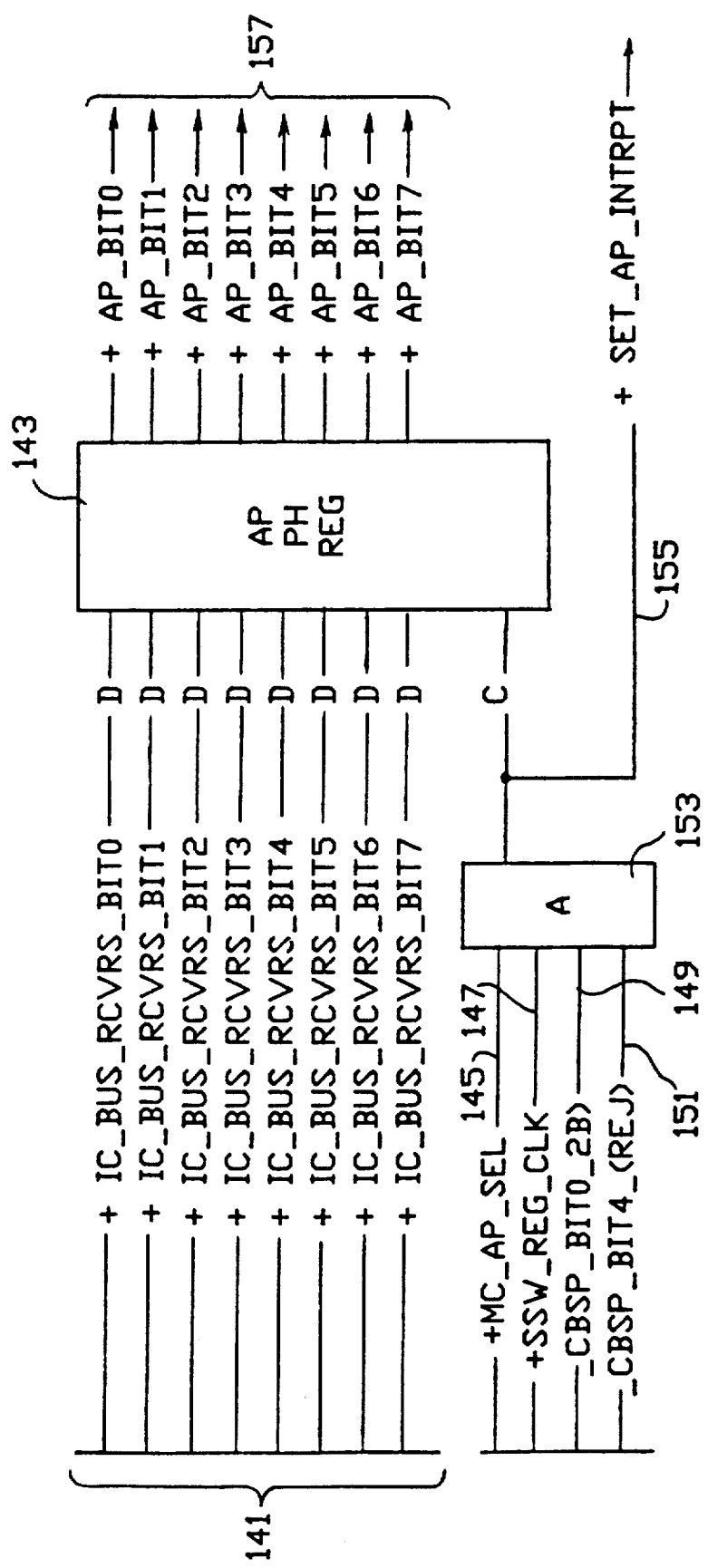
FIG. 4 is a block diagram detailing the Attention port.

Refer now to FIG. 4 for details of the Attention Port (AP). The host processor has read/write access to the AP. During System Software Write (SSW) or System Software Read (SSR) operations to the AP, the Micro Channel I/O address must be equal to the value assigned to the AP during the Micro Channel SETUP, to select the subsystem.

The AP receives the 8-bit attention command input of an AP register 143. The input attention command is clocked into register 143 when AND gate 153 is active, with the attention command being provided at the register output 157. A SET_AP_INTRPT signal is provided on line 155 whenever gate 153 is active. This signal is an interrupt to the subsystem local processor signalling that a command has been written to the AP by the host processor. Whenever gate 153 is inactive, an attention command can not be clocked into register 143, and is therefore ignored by the subsystem.

Four inputs control whether or not gate 153 has a ONE output. A positive logic input is denoted by a plus (+) sign, and a negative logic input is denoted by a negative (−) sign. The first input on line 145 is a +MC_AP_SEL signal which when a ONE indicates that the Micro Channel address for the AP is valid and the host processor has selected the AP for this subsystem. The second input on line 147 is a +SSW_REG_CLK signal which when a ONE indicates that a Micro Channel I/O write is valid for this subsystems I/O address space. The third and fourth signals are provided from the command Busy/Status Post (CBSP). The third input on line 149 is a −CBSP_BITO_2B signal, which is a Busy bit (B) signal. Since this is a negative logic signal, when B is a ZERO the signal on line 149 is a ONE, and when B is a ONE the signal on line 149 is a ZERO. The fourth input on line 151 is a −CBSP_BIT4_ (REJ) signal which is the reject (REJ) signal. Since this is a negative logic signal, when REJ is a ZERO the signal on line 151 is a ONE, and when REJ is a ONE the signal on line 151 is a ZERO., It is seen that anytime the lines 145, 147, 149 and 151 are each ONE, the attention command on lines 141 are clocked into register 143, and the SET_AP_INTRPT signal on line 155 signals the local processor that a command has been written in the AP. Conversely, if any of these lines are ZERO, gate 153 provide a ZERO output which inhibits the writing of a command into AP register 143. Specifically, if either the Busy bit or the REJ bit is a ONE, the writing of a command to AP register 143 is blocked.

The Subsystem Control Port 152 is a subsystem read/system write register. This is an 8 bit Read/Write port which provides direct hardware control of several subsystem wide functions. Included in this port are bits to control the reset of the subsystem and all attached devices, enable or disable the subsystem from presenting physical interrupts to the main processor, a subsystem DMA enable/Disable function, and lastly a function to reset an error caused when a command is rejected without execution by the subsystem. The format and function of the Subsystem Control Port 152 is shown for bits 0–7 in FIG. 3, the function of which is set forth below.

---

EI Enable Subsystem Interrupts.

BIT 0 - EI

This bit enables the subsystem to send a physical Interrupt to the system when it is set to ONE. The EI bit is initialized to ZERO when the subsystem is powered on or reset by a Reset Subsystem. When the EI bit is ZERO, the subsystem is disabled for physical interrupts and is not allowed to send a physical interrupt to the main processor. This bit remains set until it is explicitly reset by an OUT command to the port or a Reset Subsystem.

BIT 1 - DMA - Enable DMA.

When this bit is set to ZERO, the subsystem is not allowed to initiate any DMA operations. Setting this bit to ZERO, places the subsystem into a state where it cannot execute any SCB commands or store any SCB logical interrupt status (TSB). This bit is set to ZERO when the subsystem is powered on, and is reset to ZERO by a Reset Subsystem. The bit remains set until it is explicitly reset by an OUT command to the port or a Reset Subsystem. (The DMA bit is intended as a means of debugging hardware. It may also be used as a means to force the subsystem to halt Micro Channel activity.)

BIT 2 & 3 - S.D. - Subsystem Dependent.

-continued

Bits 2 and 3 of
the port are reserved for subsystem dependent
functions.

BIT 4 & 6 - R - Reserved.

Bits 4 and 6 are Reserved and
must be set to ZERO.

BIT 5 - RR - Reset Reject.

When the host processor
sets this bit to ONE, and the subsystem is in
the Reject State, the Reject State will be
cleared, by setting the RR bit ON, i.e., to a
ONE. When the Reject State is cleared, the
Busy (B) and Reject (REJ) bits in the Command
Busy Status are set to ZERO. If the
subsystem is not in the Reject State, then
writing a ONE to the RR bit causes no effect.
The RR bit is set to ZERO when the subsystem
is powered on, or reset by a Reset Subsystem.
The setting of this bit remains until it is
explicitly reset by a specific OUT command to
the port or a Reset Subsystem. Writing a
ZERO value to the RR bit does not effect the
internal state of the subsystem.

BIT 7 - RST - Subsystem Reset.

This bit is used to
provide a hardware controlled reset of the
subsystem and all the devices attached to it.
When set to ONE, the subsystem enters the
Reset Pending State, and sets the Busy bit
(B) in the Command Busy Status Port to ONE.
All device activities on the subsystem are
halted. The program must write a ZERO value
to RST in a time period which is subsystem
specific. The transition of the RST bit from
a value of ONE to ZERO while in the Reset
Pending State places the subsystem into the
Reset in Progress state. In this state, the
subsystem completes resetting itself and all
devices attached to it. When the reset is
complete, the Busy bit will set to ZERO, and
an interrupt of the main processor will be
attempted.

The Interrupt Status Port 154 is a system read/subsystem write register. This 8 or 16 bit register is used by the subsystem to present interrupt data to the program. Interrupts for Immediate Commands, SCB commands with severe hardware failure, Non SCB Command, or SCB Commands are presented in this port. Additional SCB completion status is presented in the Termination Status Block (TSB) area associated with each SCB. The function of a TSB is described subsequently. No new interrupts can be presented to the system through the ISP until it is explicitly reset by the system software.

The 8 bit register configuration for the Interrupt Status Port 154 are shown in FIG. 3, and the bit assignments are as follows:

BITS 7-4 - Interrupt ID.

These bits are encoded with a
number which identifies the cause of the
interrupt presented. The program can obtain
more information by examining the TSB status,
for an SCB interrupt.

BITS 3-0 - Device Address.

The device address which
originated the interrupt presented.

The format of the 16 bit Interrupt Status Port (not shown) is as follows:

BITS 15-12 - Interrupt ID.

These bits are encoded with a number which identifies the cause of the
interrupt presented. The program can obtain
more information by examining the TSB status,
for SCB interrupt.

BITS 11-0 - Device Address.

The device address which
originated the interrupt presented.

The Command Busy/Status Port 156 is a subsystem Write/system read register. This 8 bit port has two functions: First it must be read by the system before each command is submitted to determine the status of a prior submitted command. After a command is submitted, the program must allow a subsystem a defined time period to elapse before it attempts to read this port to obtain command status.

Secondly, the port indicates whether or not the subsystem has a valid interrupt value present in the Interrupt Status Port, ISP 154. This ISP should not be read by the program unless the Command Busy/Status port indicates that a valid value is present, IV equals to ONE.

The format and function of the Command Busy Status Port 156 is as follows:

BIT 0 - B - Busy Bit.

This bit indicates whether or
not the Command Interface and Attention Ports
are currently being used. A program should
not attempt to write either the Command or
Attention ports of the subsystem when the
Busy (B) bit is ONE. The Busy bit (B) is ONE
if the subsystem is in the following states:
Reset Pending, Reset in Progress, Reject, or
Decode as explained below. If the host
program writes the Attention and/or Command
ports while the Busy bit (B) is ONE, the
attempted write to these ports is ignored by
the subsystem, and the newly attempted
command is ignored by the subsystem without
any indication of error.
This bit is set to ONE when the subsystem
enters the states: Reset Pending, Reset in
Progress, Reject or Decode. The subsystem
enters the state Reset Pending when the RST
bit of the Subsystem Control Port is set to
ONE. If the subsystem is Reset Pending and
the RST bit of the Subsystem Control port is
set to ZERO, then the Subsystem enters the
state Reset in Progress. The subsystem also
enters the Reset in Progress State, when a
Reset Device Command is issued to device 0,
the subsystem itself.
When the subsystem completes a Reset
Subsystem Command exiting the Reset in
Progress state, the BUSY bit is set to ZERO.
The subsystem enters the Decode state, when
the program submits a new command by a write
to the Attention port, and the subsystem is
not in the states Reset Pending, Reset in
Progress, or Decode. The Busy bit is also
set to ZERO, when the subsystem exits the
Decode State, by accepting a command. When
the command being processed in the Decode
state is rejected, the subsystem exits the
Decode State, and enters the Reject State.
In the Reject State, the Reject (REJ) and the
Busy Bit (B) are set to ONE. The Status bits
(S) will indicate the reason the command was
rejected by the subsystem. When a subsystem
enters the state Reset Pending, the states
Reject or Decode are cleared.

BIT 1 - IV - Interrupt Valid.

This bit is set to ONE
after the subsystem writes an interrupt value

-continued in to the Interrupt Status Port (ISP) of the subsystem. When IV is ZERO, the ISP does not contain a valid interrupt value. When IV is ONE, reading the ISP will give a valid interrupt ID and device number.

BIT 2 - Reserved.
BIT 3 - Reserved.
BIT 4 - REJ Bit.

This bit will be set to ONE when the subsystem decides to reject a command submitted through the Command Interface port and the Attention port. The subsystem exits the Decode State and enters the Reject State. The Status (S) Bits in the Command Busy status port will contain an encoded value which indicates why the command was rejected. When the subsystem exits the Decode State by accepting the command submitted to the subsystem, then the Reject (REJ) and Busy (B) Bits in the Command Busy Status Port will both be ZERO.

When a subsystem is in the Reject State, a program cannot submit a new command by writing to the Command or Attention ports. These write Attempts are ignored, and these ports continue to contain the values of the command which was rejected. When a subsystem is in the Reject State, both the REJ and Busy bits are set to ONE by the subsystem.

The subsystem can be removed from the Reject State by setting the RST bit of the Subsystem Control Port to ONE, executing a hardware controlled Reset Subsystem, or by setting the RR bit of the Subsystem Control Port to ONE, issuing a hardware controlled Reset Reject. The use of the RR bit is the usual method of clearing the Reject State. When the subsystem is removed from the Reject State, both the REJ and Busy bits are set to ZERO by the subsystem.

BITS 5-7 - Status Bits.

An encoded three bit value set in the Command Busy/Status Port after a command submitted through the Attention port has been rejected during the Decode State. The Subsystem exits the Decode State and enters the Reject State with the Reject (REJ) bit and the Busy bit (B) are equal to ONE. The values of the S bits are undefined and should be ignored by a host program unless the REJ bit is ONE.

The encoded values of the S bits are:

| | |
|---|---|
| S = 000 | Reserved. |
| S = 100 | Device Unavailable Reject. This condition arises when the subsystem is able to determine that a device is not functional enough to execute a command. The condition cannot arise for Reset Device or Reset Subsystem. This condition may be cleared by either of these two commands. |
| S = 010 | Invalid Command. This condition arises when the subsystem does not recognize an Attention code in the Attention Port or the Immediate Command Code specified in bits 0 to 7 of an immediate command submitted in the Command Port are not valid. |
| S = 011 | Device Busy. This condition arises when the device is busy executing a command, and cannot accept a new command at this time. The condition cannot arise for a Reset Device or a Reset Subsystem. |
| S = 100 | Device in SCB Execution Reject. This condition arises when the program places the device in the state where it is not permitted to executive any SCB commands, by issuing a Suspend command. The condition can be cleared by a Resume, Reset Device or Reset Subsystem. |
| S = 101 | Invalid Device Address. This condition arises when the system places an invalid, non-existent device number in the Attention Port. If the Attention Port is 8 bits wide, then bits 3 to 0 contain an invalid device number. For a 16 bit wide Attention Port, bits 11 to 0 contain an invalid device number. |
| S = 110 | Reserved. |
| S = 111 | Device Interrupt Queue Full. This condition arises when a device has used all the internal storage in the interrupt queue it maintains for interrupts that have not been stored in the Interrupt Status Port of the subsystem. All commands except Reset Device, Reset Subsystem, and Reset Interrupt will be rejected by the device if the condition exists. This condition is cleared for the device as soon as it able to write data from its interrupt queue into the Interrupt Status port of the subsystem. |

Figure 5B:
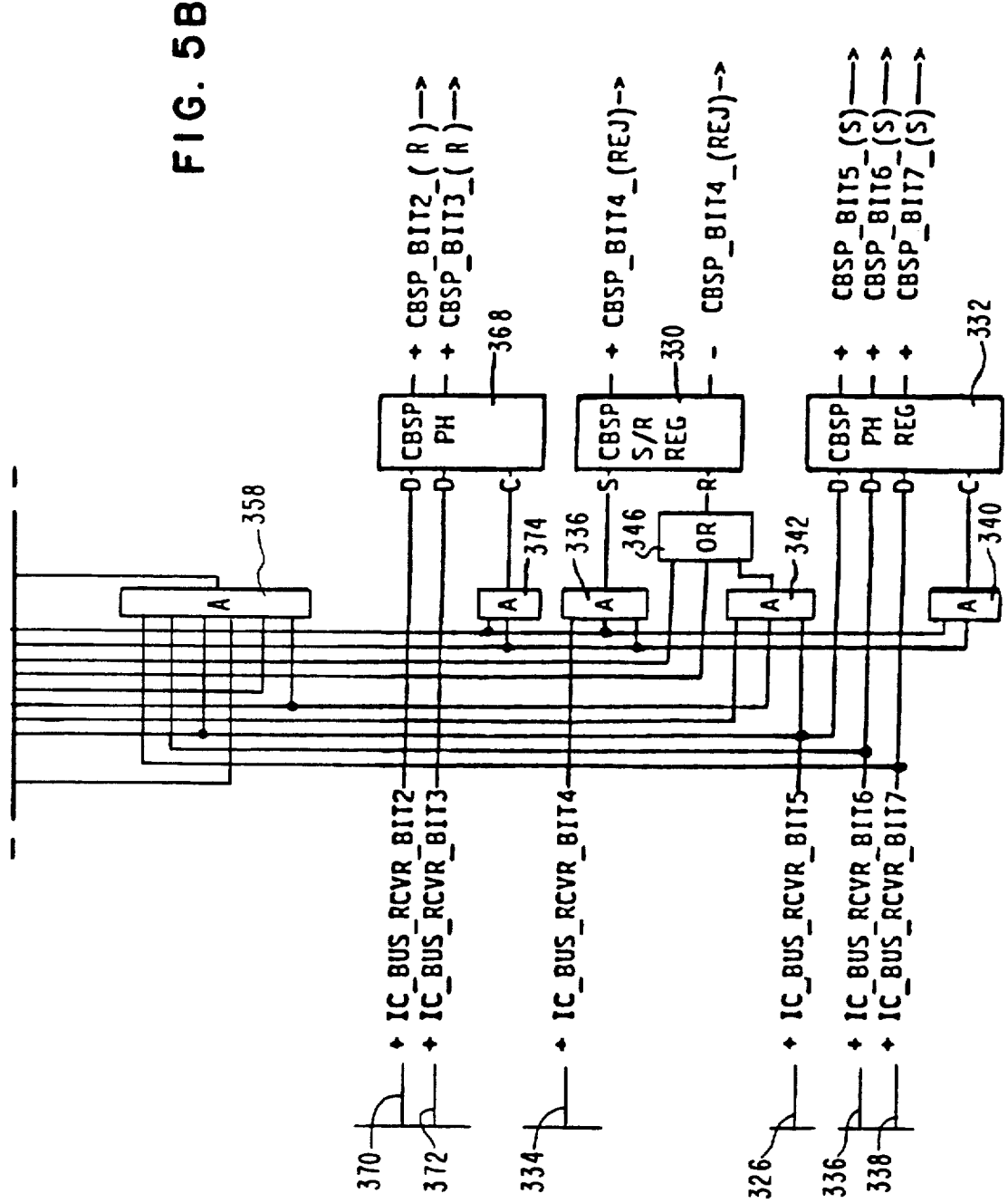
FIG. 5 is a block diagram detailing the Command busy/status port.

Refer now to FIG. 5 which details functionally how the respective bits of the Command/Busy Status port (CBSP) 156 are manipulated.

The Busy bit (B), CBSP_BIT0_(B) is implemented in a register combination of a S/R register 302 and a Polarity Hold (PH) register 300. If the Busy bit is ZERO or inactive, it can be set to ONE by any of three specific actions.

1. If the Micro Channel CHRESET signal on line 314 is a ONE, the output of OR gate 310 is a ONE which is provided to the Set (S) input of register 302. This sets register 302 to a ONE which is applied to the D input of register 300. The inverse MC_AP_SEL signal from inverter 312 is applied to the Clock (C) input of register 300, and the output +CBSP_BIT0_(B), the Busy bit (B), is set to ONE.

2. If the system programs writes a ONE to bit 7 of the Subsystem Control Port (SCP), as manifested by the +SCP_BIT7(RST) signal on line 316 being ONE, the output of OR gate 310 becomes a ONE, and registers 302 and 300 and the Busy bit (B) are set to ONE as set forth in action 1 above.

3. If there is a Write by the software to the AP, the signals +MC_AP_SEL on line 304 and +SSW_REG_CLK on line 306 are each a ONE which causes AND gate 308 to have a ONE output. The ONE from gate 308 causes OR gate 310 to have a ONE output, and registers 302 and 300 and the Busy bit (B) are set to ONE as set forth in actions 1 and 2 above.

If the Busy bit (B) is a ONE it can be cleared, that is set to ZERO, in either of two ways.

1. The Busy bit (B) is cleared by the system program writing a ONE to the Subsystem Control Port (SCP) bit 5 (RR). This also clears the Reject (REJ) bit as set forth below. When the RR bit is ONE in the SCP, the signals +MC_SCP_SEL on line 328; +IC_BUS_RCVR_BIT5 on line 326; and +SSW_REG_CLK on line 306 each become a ONE, which produces a ONE at the output of AND/OR gate 318. This ONE is applied to the Reset (R) of register 302, the output of which becomes ZERO which is applied to the D input of register 300. The signal +MC_AP_SEL on line 304 is ZERO at this time, which ZERO is inverted by inverter 312 to a ONE. This ONE is applied to the C input of register 300, clocking in the ZERO at the D input, thereby setting register 300 to ZERO. The Busy bit (B), the output +CBSP_BIT0_(B), becomes ZERO when register 300 is set to Zero.

2. The Busy bit (B) is also cleared by the subsystem after the Command Handler has exited the Decode state and entered the Accept state. The subsystems local processor writes a ZERO to bit 0 of the CBSP. The signals −IC_BUS_RCVR_BIT0 on line 320; +LP_CBSP_SEL on line 322; and +LPW_REG_CLK on line 324 each become ONE, producing a ONE at the output of AND/OR gate 318. This resets register 302 and register 300 to ZERO as set forth above. The Busy bit (B) becomes ZERO when register 300 is set to ZERO.

If the subsystem is performing a subsystem reset indicated by the system writing SSCP bit 7 to a ONE, the Busy bit (B) will be reset by the subsystem when the subsystem has completed the subsystem reset. Assume that the Busy bit is ON and the subsystem is in the decode state and then the reject state. The Busy bit is also reset with the reject bit (CBSP bit 4) via the Reset Reject bit 5 in the SCP in the following manner. The system writes a ONE into the SCP bit 5 (RR) position. Once the write to the SCP has been detected by the subsystem, line 326 (IC_BUS_RCVR_BIT 5) becomes active, as well as line 328 (MC_SCP_SEL) and line 306 (SSW_REG_CLK). These lines being active turns gate 318 ON resetting register 302 to OFF. Register 302 being OFF concurrent with inverter 312 being ON, as previously described, resets register 300 OFF, setting the Busy bit (B) OFF.

The CBSP REJ bit (4) and CBSP status bits (5,6,7) are represented by registers 330 and 332, respectively. When the subsystem has entered the reject state, CBSP bit 4 is set to ONE, and CBSP bits 5,6 and 7 (status) are set to the reject code. The S/R register 330 is set to ONE when lines 334, 332 and 324 are active, which turns on AND gate 336 which sets S/R Register 330 ON, turning ON the REJ bit. The status bits in register 332 are set ON by placing the status code on lines 326, 336 and 338. The status code is clocked into register 332 by lines 322 and 324 being active which turns ON AND gate 340 which activates the C input of register 332.

The reject (REJ) bit is reset OFF whenever OR gate 346 is ON. OR gate 346 is ON when line 326 (CHRSET) is active, or line 316 (RST) is active, or AND gate 342 is ON. AND gate 342 is ON if line 326 and line 328 and line 306 are active. This represents that the system has written the reset reject bit 5 (SCP) to a ONE, releasing the subsystem from the reject state.

The CBSP_BIT1_IV is implemented as the output of S/R register 348. Register 348 is set to ONE whenever AND gate 350 is ON. AND gate 350 is turned ON if lines 322 and 324 and 352 are active. The IV bit is set to ONE after the subsystem has written the Interrupt Status port (ISP).

The host processor reads the IV bit as a result of a Micro Channel interrupt asserted by the subsystem or may use the IV bit to poll the subsystem for interrupts. After the host processor has read the ISP, and the host interrupt handler has processed the interrupt, the host processor issues a reset interrupt attention code (1110h) to the subsystem via the Attention port.

S/R register 348 is reset to OFF whenever OR gate 354 is ON. OR gate 354 is turned ON if line 314 (CHRESET) or line 316 (CDRESET) or AND gate 356 or AND gate 358 is ON.

AND gate 356 is ON if the IC_BUS_RCVR bits (7-4) on lines 360, 362, 364 and 366, respectively are set with the binary value "0000"(reset device immediate) from the attention port bits 7-4, respectively, and lines 304 and 306 are active.

AND gate 358 is turned ON if the IC_BUS_RCVR bits (714) on lines 338, 336, 326 and 366 are set with the binary value "1110" (reset interrupt) and lines 304 and 306 are active.

The CBSP Reserved (R) bits are represented by register 368. The two data (D) inputs are set when lines 370 and 372, IC_BUS_Bits (2,3) are active. These bits are clocked into register 368 when AND gate 374 is ON. AND gate 374 is ON when lines 322 and 324 are ON.

The formats utilized in the Command interface port and Attention port are dependent on whether an immediate command or an SCB command is provided from the host system to the subsystem. Immediate commands are mainly device directed and are control oriented. Refer to FIG. 6 for the general format of the command interface port as indicated at 160; and the code for three types of immediate commands at the attention port as indicated at 162, 164 and 166, respectively. If a command is directed to a device, the device must verify that the full command is received before executing the immediate command. To determine the command type, bits 7 through 4 of the attention port are examined. If a reset device command type is received, the code is as indicated at 162; if an immediate command (command type) is received the code is as indicated at 164; and if a reset interrupt (EOI) command type is received the code is as indicated at 166.

Bits 7-0 of the command interface port, as indicated at 160, specify the operating code. When the command is received, the device sets the Busy bit in the command busy/status port (not shown). The device must insure that the time that the port remains busy is kept to a minimum. On a subsystem reset command, the subsystem must hold the port busy until the reset has completed.

Command interface port definitions for immediate commands are as follows:

IC Bit 8
Specify Immediate command Format IC Bit 8 is used to specify the Immediate command format type used. If IC bit 8 = 1. The Immediate command format is defined as TYPE 1.
IC Bits 31 - 16
Reserved (Set to zero by software prior to issuing command). If IC bit 8 = 0. The Immediate command format is defined as TYPE 2.
If IC Bit 8 = 0.
IC Bit 8 is used to specify the Immediate command format type 2 used. The difference in bit definitions are noted below.
IC Bits 13 - 16 - OP CODE DEPENDENT
IC Bit 15 - DISABLE COMMAND INTERRUPT.
If bit 15 = 0, interrupt after the Immediate Command has completed and report status in the Interrupt Status Port (ISP). If bit 15 = 1, do not interrupt on completion of the Immediate Command, unless an error occurred. Some commands ignore this specification.
IC Bit 14 - DISABLE DEVICE INTERRUPT
If bit 14 = 0, then interrupts are enabled to the system for the specified device. If bit 14 = 1, then interrupts are disabled to the system for the specified -continued device.

IC Bits 13-9 - OP CODE DEPENDENT BITS

These bits allow modifying of the Command field. Currently, BITS 13 & 12 are used by the Reset Device Command. Bits 12-9 are used by the Immediate Reset SCB Interrupt command to specify the interrupt count to be reset.

IC Bits 7 → 0 - Immediate Cmd Bits

Decoded as follows:

| BITS 7 6 5 4 3 2 1 0 | |
|---|---|
| 0 0 0 0 0 0 0 0 | IMMEDIATE RESET DEVICE |
| 0 0 0 0 0 0 0 1 | RESERVED |
| 0 0 0 0 0 0 1 0 | NOOP |
| 0 0 0 0 0 0 1 1 | RESERVED |
| 0 0 0 0 0 1 0 0 | RESET INTERRUPT STATUS PORT |
| 0 0 0 0 0 1 0 1 | RESERVED |
| 0 0 0 0 0 1 1 0 | RESERVED |
| 0 0 0 0 0 1 1 1 | RESERVED |
| 0 0 0 0 1 0 0 0 | RESET SCB INTERRUPT(S) |
| 0 0 0 0 1 0 0 1 | RESERVED |
| 0 0 0 0 1 0 1 0 | RESERVED |
| 0 0 0 0 1 0 1 1 | RESERVED |
| 0 0 0 0 1 1 0 0 | DEVICE DEPENDENT |
| 0 0 0 0 1 1 0 1 | DEVICE DEPENDENT |
| 0 0 0 0 1 1 1 0 | DEVICE DEPENDENT |
| 0 0 0 0 1 1 1 1 | DEVICE DEPENDENT |
| 0 0 0 1 0 0 0 0 | RESERVED |
| 0 0 0 1 0 0 0 1 | RESERVED |
| 0 0 0 1 0 0 1 0 | RUN IMMEDIATE DIAGNOSTICS |
| 0 0 0 1 0 0 1 1 | DEVICE DEPENDENT |
| 0 0 0 1 0 1 0 0 | RESERVED |
| 0 0 0 1 0 1 0 1 | RESERVED |
| 0 0 0 1 0 1 1 0 | RESERVED |
| 0 0 0 1 0 1 1 1 | DEVICE DEPENDENT |
| 0 0 0 1 1 0 0 0 | RESERVED |
| 0 0 0 1 1 0 0 1 | RESERVED |
| 0 0 0 1 1 0 1 0 | RESERVED |
| 0 0 0 1 1 0 1 1 | RESERVED |
| 0 0 0 1 1 1 0 0 | RESERVED |
| 0 0 0 1 1 1 0 1 | RESERVED |
| 0 0 0 1 1 1 1 0 | RESERVED |
| 0 0 0 1 1 1 1 1 | SUSPEND |
| 0 0 1 0 0 0 0 0 | RESUME |

All reserved bits are set to zero by system software prior to issuing the command. All other decodes of bits 0-7 are reserved.

Refer to FIG. 7 for the general format of the Command interface port, as indicated at 168; and the Attention port, as indicated at 170, for SCB commands. The Command interface port contains the starting address of the SCB. The starting address is a physical address and must be on a double word boundary. The format of the Attention port for a start SCB attention request is as indicated at 170.

As previously set forth, indirect commands are contained within a SCB. SCB's may be chained in a specific order and are treated as one logical request. Data buffers may be chained using an indirect list. The structure also allows for handling elaborate status information in case of errors during the processing of a request. The status is placed in a Termination Status Block (TSB). In order to handle termination at any point in a chain of commands there is a TSB defined for each SCB in a chain.

Figure 8:
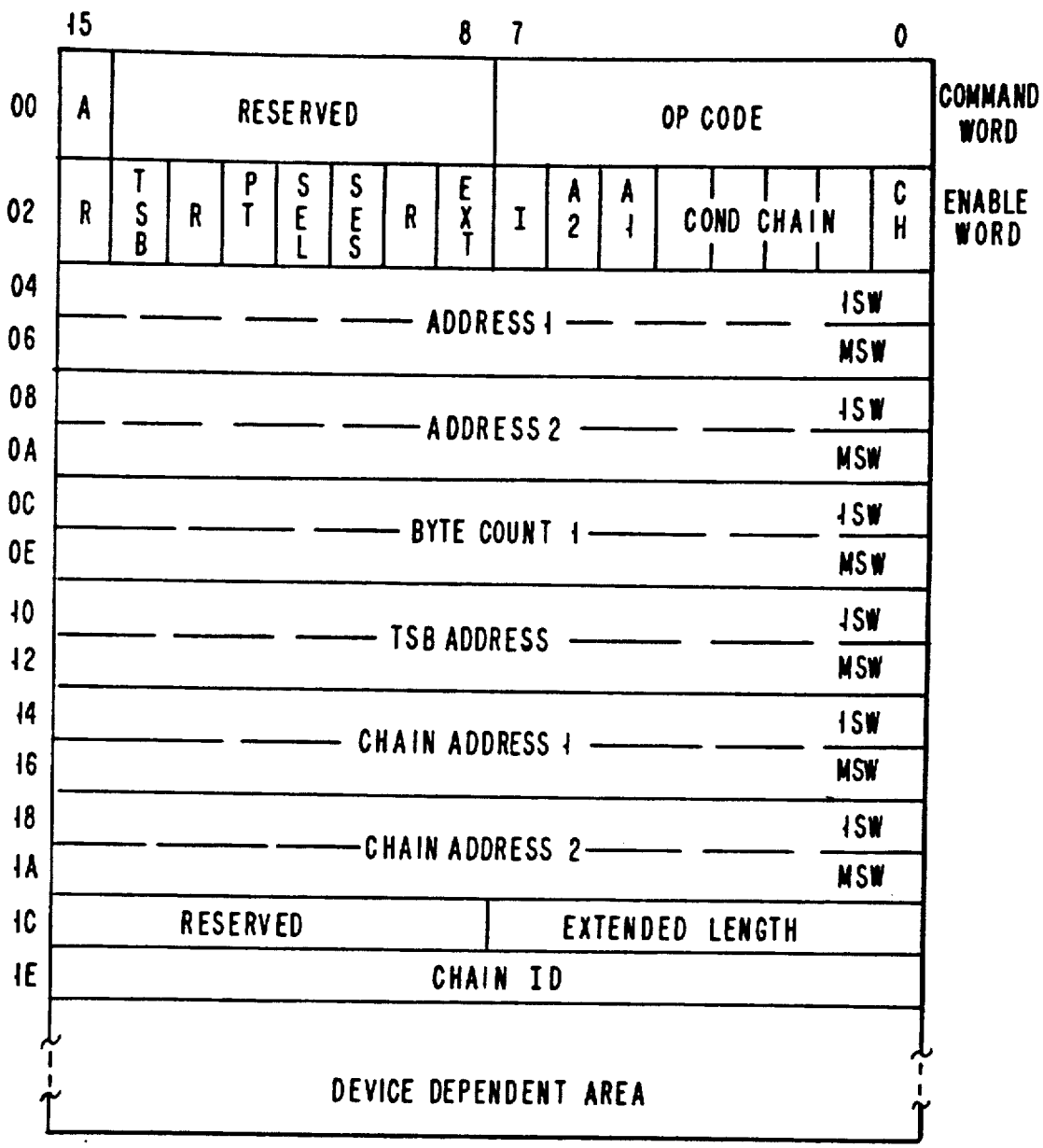
FIG. 8 illustrates a detailed (SCB) format of the control block utilized in the computing system of the invention.
Figure 9:
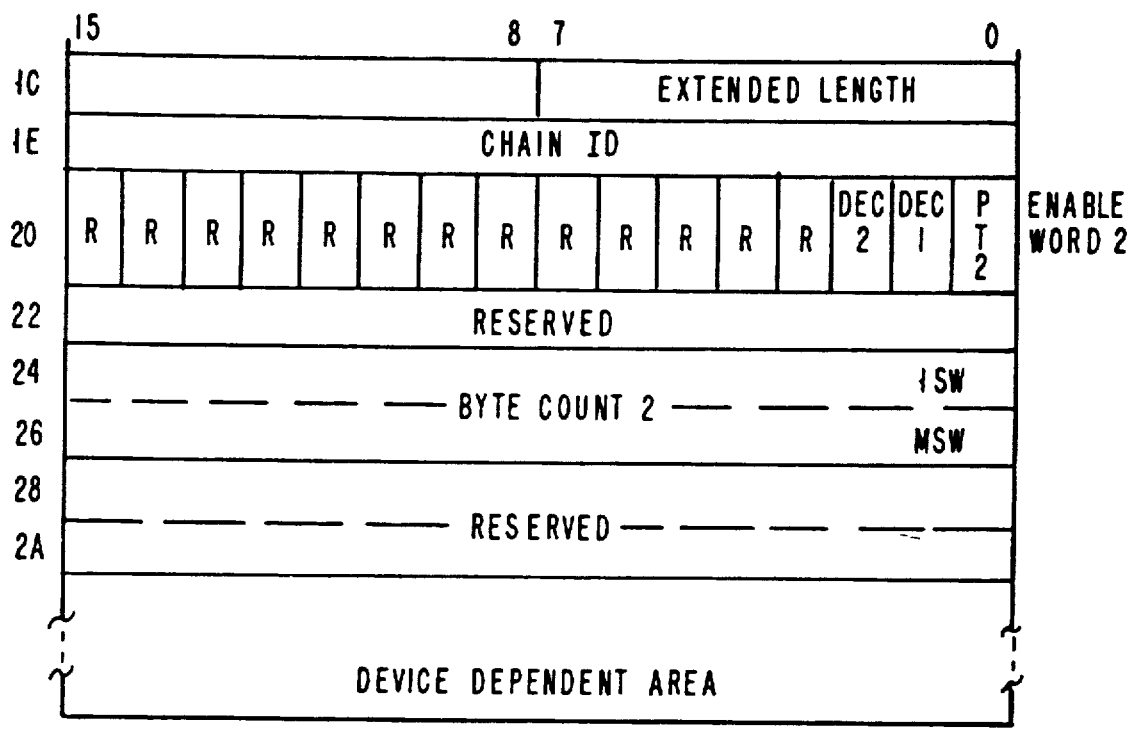
FIG. 9 illustrates a detailed extended SCB format.

There are two detailed versions of a SCB layout. These are referred to as the basic format shown in FIG. 8, and the extended format shown in FIG. 9. The extended format is made up of the basic format with additional fields added to the end. A brief definition of each of the fields and the acronyms utilized is as follows:

1. Command Word

It is used to define the type of SCB command being delivered. This word has three fields.

Op Code—contains an 8 bit operation code for this SCB's command

A—one bit indicator to tell if this SCB contains an architected or unarchitected command code. The layout shown applies to both architected and non-architected command codes Reserved 2. Enable Word The various fields in the SCB allow for a variety of command specific operations. The enable word contains a number of fields which indicate the use of these fields for this command. It also has indicators which define the type of reply indications that are to be used.

CH—CHain to the next SCB (address of next SCB is in chain address 1 field) if there is no error.

COND CH—bit 1 indicates to CHain to the SCB whose address is in chain address 2 on certain CONDitions defined by bits 2, 3 and 4.

A1—indicates that this command uses address 1 to point to either a buffer or to an indirect list (which has a set of pointers to buffers) (specific use defined by the command)

A2—indicates that this command uses address 2 to point to either a buffer or to an indirect list (which has a set of pointers to buffers) (specific use defined by the command)

I—disables Interrupt when command completes without error

EXT—indicates that this SCB has the EXTended format

R—reserved

SES—Suppress Exception Short (as when data read is less than buffer size provided)

SEL—Suppress Exception Long (as when data read from a device is more than the size of the buffers(s) provided by the command PT—indicates this command uses an indirect list to PoinT to a chain of buffers (data chain on command)

TSB—indicates that TSB status is to be stored only on an error

3. Enable Word 2

When the extended format is used additional indicators are provided in enable word 2 located in the extension portion. These indicators are:

PT2—indicates that address 2 PoinTs to an indirect list (length of list in byte count 2)

DEC1—indicates that memory address 1 should be DECremented rather than incremented DEC2—indicates that memory address 2 should be DECremented rather than incremented

4. ADDRESS 1

Contains 32 bit address which points to a data buffer or to an indirect list. The use is defined by the command. An enable word indicator (PT) indicates which form of address is being used.

5. ADDRESS 2

Contains a 32 bit address which points to a data buffer or to an indirect list. The use is defined by the command. An enable word indicator (PT2) indicates which form of address is being used.

6. BYTE COUNT 1

Contains a 4 byte count that defines the length of the buffer or indirect list pointed to by the address in address 1 or address 2.

7. BYTE COUNT 2

Contains a 4 byte count that defines the length of the buffer or indirect list pointed to by the address in address 2. This field is located in the extension.

8. TSB ADDRESS

Contains a 32 bit address for the TSB associated with this SCB.

9. CHAIN ADDRESS 1

Used to point to next SCB in a request that uses command chaining.

10. CHAIN ADDRESS 2

Used to point to an SCB to be used when conditional chain conditions are satisfied.

11. CHAIN ID

Contains a 16 bit identifier for the chain. The value is the same for all SCBs in a chain (request).

12. EXTENDED LENGTH

A one byte count indicating the number of bytes in the extension to the base format. The other byte of this word is reserved.

Figure 10:
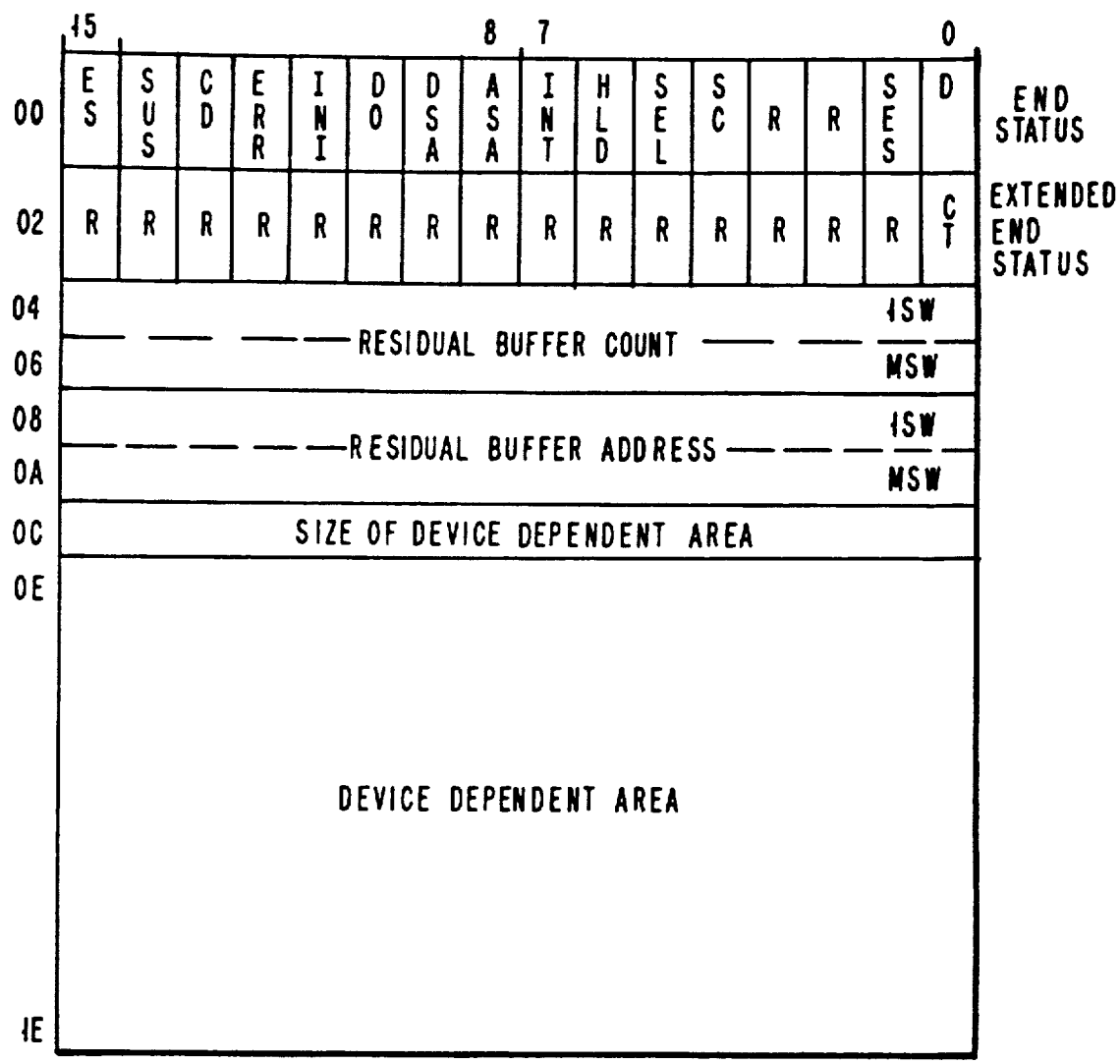
FIG. 10 illustrates a detailed SCB Termination Status Block (TSB) format.
Figure 11:
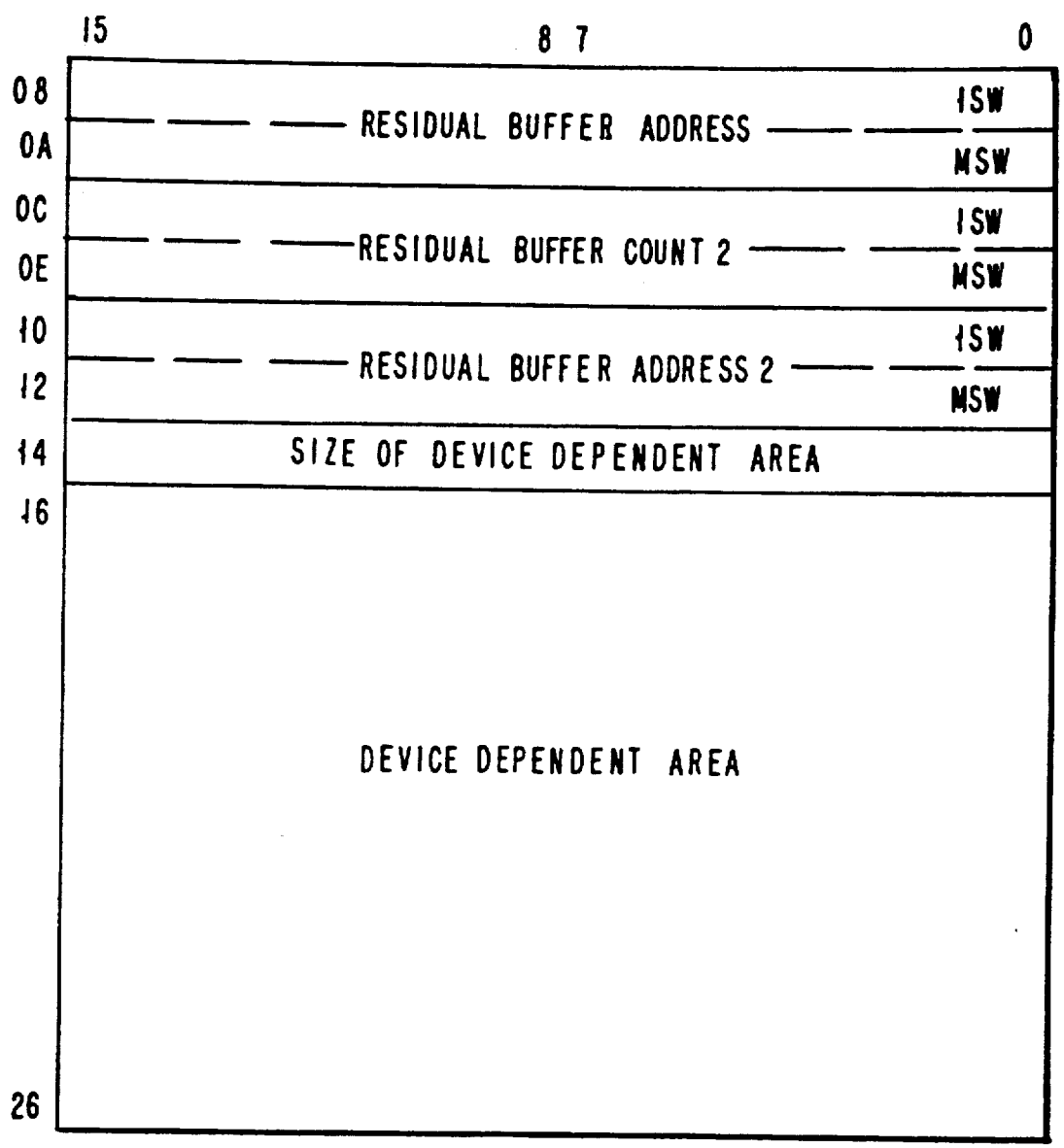
FIG. 11 illustrates a detailed extended TSB format.

In addition to the error/no-error indication in the Interrupt Status Port 154, the invention provides for detail status information to be reported from a subsystem to the host computer for each command in a SCB chain. This is reported in the Termination Status Block (TSB). Each SCB includes a TSB address in system memory to which a subsystem writes completion or termination status of the SCB. The TSB has a basic format as shown in FIG. 10 and an extended format as shown in FIG. 11. When the extension is added to the basic format, the location of the count indicating the size of device dependent information is changed.

The following is a brief definition of the various fields used in the basic and extended TSB format:

1. End Status Word

This word contains a number of indicators which define specific status information related to the execution of the command contained in the SCB which points to this TSB.

D—indicates request is Done with no error

SES—indicates short length—associated with the SES indicator in the SCB enable word R—reserved SC—indicates Specification Check for the SCB. The SCB is not valid.

SEL—indicates long length—associated with the SEL control in the SCB enable word HLD—indicates the SCB command chain HaLte D INT—indicates request for logical INTerrupt ASA—indicates Architected Status Available DSA—indicates Device dependent Status Available (used together ASA and DSA indicate extended format)

DO—indicates Device Overrun

INI—indicates device not INItialized

ERR—indicates major ERRor has occurred

CD—indicates Chaining Direction (following normal chain or conditional chain)

SUS—indicates SUSpend command completed against SCB.

ES—indicates Extended Status used

2. Extended End Status

This word has additional status indicators. Only one indicator is currently architected.

CT—indicates Command Type (SCB or Immediate command)

3. RESIDUAL BUFFER COUNT

This is a 4 byte count containing the number of bytes left in the buffer pointed to by the residual buffer address.

4. RESIDUAL BUFFER ADDRESS

This is a 32 bit address of the buffer being used when the request terminated. It may be the address 1 or address 2 buffer address from the last SCB or an address in an indirect list pointed to by address 1 or address 2 in the last SCB. The specific meaning is command specific.

5. RESIDUAL BUFFER COUNT 2

This is a 4 byte count (in the TSB extension) containing the number of bytes left in the buffer pointed to by the residual buffer address 2.

6. RESIDUAL BUFFER ADDRESS 2

This is a 32 bit address (in the TSB extension) of the buffer being used when the request terminated. It may be the address 2 buffer address from the last SCB or an address in an indirect list pointed to by address 2 in the last SCB. It is used when both addresses are used by a command.

7. SIZE OF DEVICE DEPENDENT AREA

Provision is made to provide information over and above the set of architected status. The amount of this varies depending on whether basic or extended format is used. The location of this field is different in the basic format and in the extended format. Additional status is subsystem dependent.

8. DEVICE DEPENDENT DATA

This area contains device dependent status information. The areas maximum size is determined by which format is being used.

Figure 12:
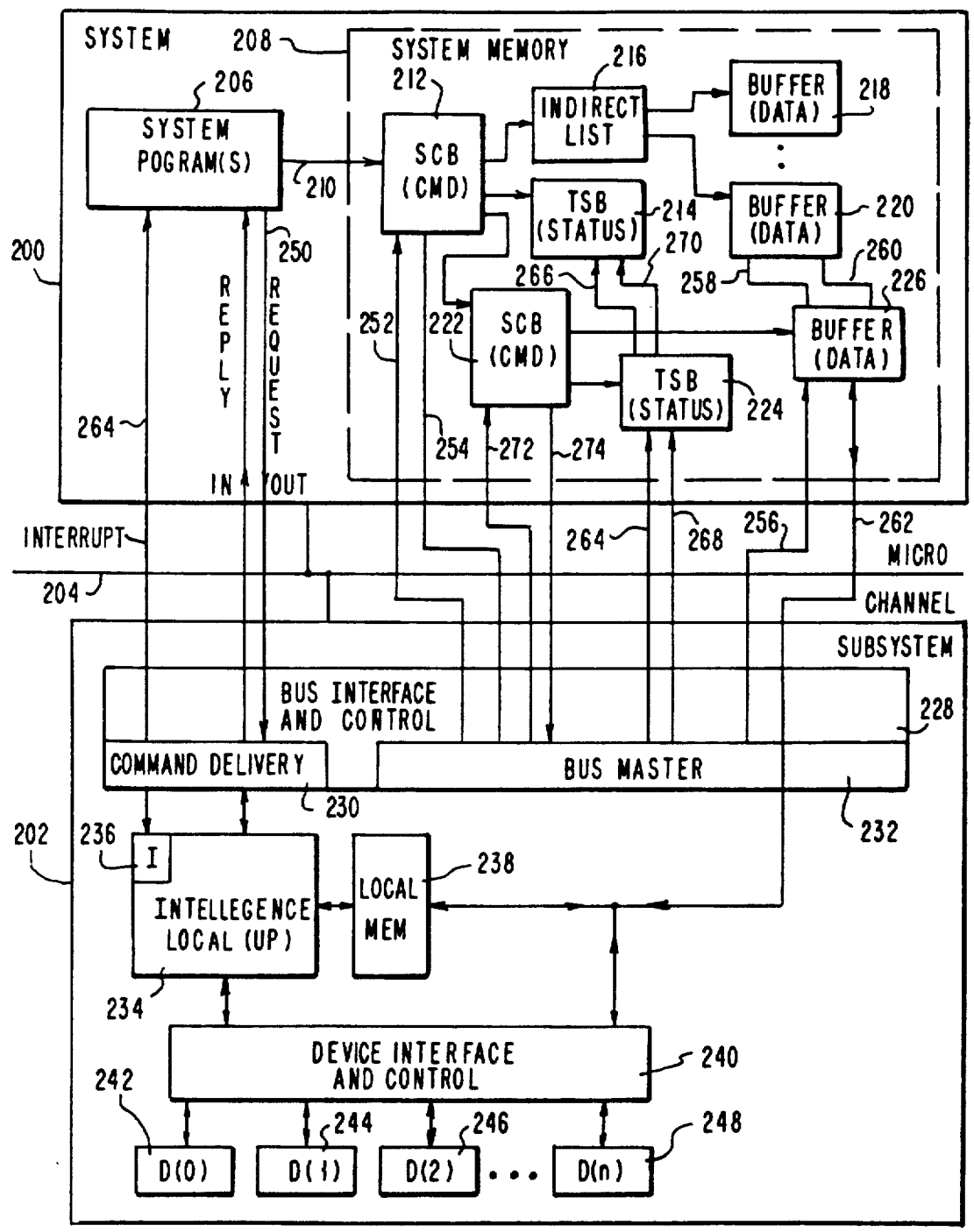
FIG. 12 is a block diagram of the computing system detailing the SCB format in system memory.

The details of the Computing system of the invention utilizing the SCB format just described, is set forth in FIG. 12. As previously described, a host system 200 exchanges information with at least one intelligent subsystem 202 via a bus architecture such as a Micro Channel 204.

System programs 206 in the host system 200 build SCB's in system memory 208 via line 210. The operation of system programs is described in "PS/2 BIOS Interface Technical Reference", IBM Publication Order Number 68X-2341-00; "IBM PS/2 Operating Systems Directory Guide", IBM Publication Order number Z360-2741-0; and "IBM OS/2 TM Internals, Vol. 1", IBM Publication order number GG24-3225-0. As previously described, an SCB format provides buffer addresses, chain addresses and TSB addresses. In a page memory system, the SCB's, buffer addresses, chain addresses and TSB addresses are "pinned" in the system memory by the operating system. That is, a section of system memory is locked for this purpose. For purposes of description, an SCB 212 is shown which includes a TSB 214; an indirect list 216 which points to data buffers 218 and 220; and a chain address to an SCB 222. The SCB 222 includes a TSB 224, and points to a data buffer 226. It is to be appreciated that a plurality of like SCB's are formatted in the system memory 208, in accordance with the formats shown in FIGS. 8-11.

The subsystem 202 is similar to subsystem 102 in FIG. 2, with the only difference being that subsystem 202 is shown in more detail to describe command delivery. Subsystem 202 includes a bus interface and control unit 228 having a command delivery logic 230 and a bus master 232; a local microprocessor 234 having an interrupt (I) logic 236; a local memory 238; and a device interface and control logic 240 which connects to a plurality of devices 242, 244, 246 and 248.

The general description of the command handling system including the command handler and decode process follows relative to FIG. 12, and then a detailed functional description is set forth in flow chart form relative to FIGS. 19-25.

The system program reads the Command Busy/Status port (not shown) to verify that the Attention and Command Interface ports are not busy. The system program 206 provides the address of an SCB to the Command delivery logic 230 of the bus interface and control unit 228 via the command interface port (not shown), and the command type and the device it is intended for, to the attention port (not shown), via line 250.

The Command is validated and either accepted or rejected as part of the decode process. Assuming the Command is accepted, the subsystem writes the status into the Command Busy/Status port (not shown) and directs the Command to be executed.

The subsystem initiates bus cycles on the Micro Channel 204 using the bus master function in the bus master 232. The system memory is a Micro Channel memory slave at this time, with the Micro Channel control and address lines being driven by the bus master 232. The system memory drives the Micro Channel data bus, and the bus master function transfers the SCB('s) to the subsystem local memory 238. Once the subsystem receives an SCB, a program running in the microprocessor decodes the command and directs it to the specified device. This program operation is explained in detail relative to the flow charts of FIGS. 19-25. Buffer addresses are loaded into the bus master 232 for the transfer to be performed.

Specifically, once the SCB address is decoded, the address is provided to the system memory 208 and the SCB is fetched to the subsystem 202. For example, if SCB 212 is to be addressed, the bus master 232 activates address lines 252 with the SCB address, and the first portion of the SCB is returned via line 254. This process is repeated after incrementing the address until the entire SCB is fetched. The data to be processed is accessed via address lines 256 and 258 to data buffers 218 and 220 as pointed to via the indirect list 216. Data is returned from the buffers 218 and 220 via data lines 260 and 262. The bus master 232 then transfers the data to the local memory 238 or one of the devices via interface 240 as specified by the second portion of the command in the attention port (not shown). Status of completion or termination for the SCB is stored into TSB 214 via lines 264 and 266, with status data being provided to TSB 214 via lines 268 and 270.

SCB 212 points to SCB 222 which is addressed via line 272 with the SCB 222 being returned via line 274. The data to be processed from buffer 226 is accessed via address line 256, with the data being returned to the bus master 232 via line 262. The bus master 232 then transfers the data to the local memory 238 or one of the devices via interface 240 as described above. Status of completion or termination of SCB 222 is stored into TSB 224 by addressing via line 264, with status data being provided to TSB 224 via line 268.

The subsystem 202 also loads the Interrupt Status port (not shown) with the interrupt status for the SCB or SCB chain. This provides a physical interrupt back to the host system 200 via line 264.

Before providing a flow chart description of the command handling system, a general description is set forth below, which makes the terms used in the flow charts of FIGS. 19-25 more understandable.

Command Submission Methods and Command Types

This invention defines two methods to deliver commands to a subsystem. Certain subsystem wide, hardware specific functions are invoked using Hardware Controls, which are accessed by the program modifying bits in the Subsystem Control Port. Hardware Controls provide a fast high priority way to change the state of the subsystem, a Reset Subsystem submitted in this manner has priority over all other commands submitted to the subsystem by writing data to the Command and Attention Ports.

Hardware Controls are activated by using an OUT command to the Subsystem Control port, and changing certain specific bits.

Modifying the RR, DMA, and EI bits are not described by specific commands but these also have subsystem wide effects on the subsystem, which are summarized in "Results of Host processor attempts to set I/O ports" which follows, and the table in FIG. 14.

Commands which are submitted through writing the Command and Attention ports fall into two broad categories, Indirect (SCB based) commands, and Direct based commands. SCB based commands are distinguished by the Attention Request Code 3. In the case of an SCB command, the Command Interface Port contains the real memory address of the start of the SCB. Direct commands are of 3 types which are determined by unique Attention code settings. All Direct commands have a 32 bit value in the Command Port which along with the Attention code defines the action to be performed by the subsystem. Attention code 0 (Reset) and E (Reset Interrupt) are provided so that special case processing can be done for these commands over the other Direct commands which have an Attention Request Code of "01h". Direct commands are sometimes described by the term Immediate commands, to indicate that the command port contains a 32 bit value which completely defines the operation that must be performed. This is contrasted to an SCB command which must be fetched from the system memory address given by the command port to determine the action to be performed.

A unique attention code F (Device Dependent Attention) is defined in the Architecture. Attention code F is provided so that an implementation can provide special case handling for a command that it wishes to optimize.

Subsystem State Transitions in Command Submission

In this section those state transitions and actions are defined which occur when a command is submitted either using a Hardware Control or through the Attention Port. The data is provided in a State Transition diagram in FIG. 13. When a subsystem is in the Decode State, its acceptance or rejection of a command which is submitted is discussed in detail in "Command Handling and the Decode Process" which, follows and gives more details on the decode process, and provides a set of decision tables in FIGS. 15-18 which show how the commands are accepted and rejected by the decode process.

The following states are defined for use in Command Submission Transitions, further detail on subsystem states and the decode process is found in the discussion relative to "Command Handling and the Decode Process."

Subsystem States are:

1. Accepting Commands or ACCEPT.

The subsystem is in a state where it can accept commands submitted through the Command and Attention ports. In this state the Reject and Busy bits in the Command/Busy Status port will both be zero.

A host processor write to the Attention port will take the subsystem from this state and put it into the Decode in Process state, where it will determine if the command submitted will be accepted.

2. Subsystem Reset Pending Started or PENDS.

The RST bit in the Subsystem Control port has been set to ONE by the host program, and the subsystem has started a hardware controlled reset of its micro processor. During this state, host processor writes to the Command and Attention ports are ignored. Host writes to bits other than the RST bit of the Subsystem Control Port are ignored. When the hardware reset completes, the subsystem enters the state Subsystem Reset Pending Complete.

The Busy bit (B) is ONE, and the Reject bit (R) is ZERO in the Command Busy/Status port while in this state.

3. Subsystem Reset Pending Complete or PENDC. The subsystem has completed the hardware controlled reset of its micro processor and is waiting for a Host processor write of a ZERO bit to the RST bit of the Subsystem Control Port. While in this state Host processor writes to the Command and Attention ports are ignored. Host processor writes to the Subsystem Control Port are allowed. A write of ZERO to the RST bit of the Subsystem Control Port will take the subsystem to the Subsystem Reset in Process State.

The Busy bit (B) is ONE, and the Reject bit (R) is ZERO in the Command Busy/Status Port while in this state.

An implementation may not be able to discern the difference between the Reset Pending Started, and the Reset Pending Complete states, and may have only a single Reset Pending State. In this situation, setting the RST bit to ZERO, takes the subsystem from the Pending to the Reset In Process State.

4. Subsystem Reset in Process or RESETS.

The RST bit of the Subsystem Control Port has been set to ZERO by the host program, after an implementation defined amount of time has elapsed, while in the Reset Subsystem Pending Started state. On entering this state the subsystem completes its reset subsystem. The Host processor is allowed to modify the contents of the Subsystem Control port while the Subsystem is in this state. Host processor writes to the Command and Attention ports are ignored.

While in this state the Busy Bit in the Command/Busy Status port is ONE, while the Reject bit is ZERO.

Upon the completion of the reset subsystem, the subsystem enters the state Accepting Commands. The Busy and Reject bits in the Command Busy/Status Port are set to ZERO. The IV bit is set to ONE to indicate that the ISP contains an interrupt value for the completed Reset Subsystem.

5. Subsystem Reject or REJECT.

A command submitted through the Command and Attention Ports has been rejected by the decode process. No further commands will be accepted through the Command and Attention ports until the Reject state is cleared. While in this state, Host processor writes to the Command and Attention ports are ignored. Host processor writes to the Subsystem Control port are allowed. The Command Busy/Status port will have the Reject and Busy bits both set to ONE. The S bits in the Command Busy Status Port will have the reason the command was rejected by the decode process.

The subsystem exits the Reject state when the RR bit in the Subsystem Control port is set to ONE, or by a hardware controlled Reset Subsystem, setting the RST bit of the Subsystem Control Port to ONE.

6. Decode in Process or DECODE.

The subsystem enters this state from the Accepting Commands state, when a host processor write to the Attention port is detected. In this state the subsystem determines whether or not it will accept the command.

When the subsystem enters this state, the Busy bit in the Command Busy/Status port is set to ONE, the Reject bit will be ZERO. Host processor writes to the Command and Attention Port are ignored while in this state. Host Processor writes to the Subsystem Control port are ignored except for changes to the RST bit.

If the decode process accepts the command, the subsystem enters the state Accepting Commands. If the command is not accepted for execution, then the subsystem enters the Reject state.

The actions are:

a. Host Processor Write to Subsystem Control Port RST Bit with a 1 or RST=1.

The host processor issues an OUT command to the Subsystem Control port with the RST bit value set to ONE.

b. Host Processor Write to Subsystem Control Port RST Bit with a 0 or RST=0.

The host processor issues an OUT command to the Subsystem Control port with the RST bit value set to ZERO.

c. Host Processor Writes to the Attention Port or W/AP.

The host processor writes to the Attention Port with an OUT command.

d. Host Processor Write to Subsystem Control Port RR Bit with a 1 or RR=1.

The host processor issues an OUT command to the Subsystem Control port with the RR bit value set to ONE.

e. Reset Pending Complete or PEND COMPLETE.

The subsystem has completed the actions of resetting its micro processor and any other actions needed to allow it to wait to complete resetting the subsystem.

f. Reset Subsystem Complete or RESET COMPLETE.

The subsystem has completed the actions of resetting the subsystem.

g. Decode Accept Command or DECODE ACCEPT.

The subsystem decode process has accepted a command submitted through the Command and Attention ports.

h. Decode Reject Command or DECODE REJECT.

The subsystem decode process has rejected a command submitted through the Command and Attention ports.

Figure 13:
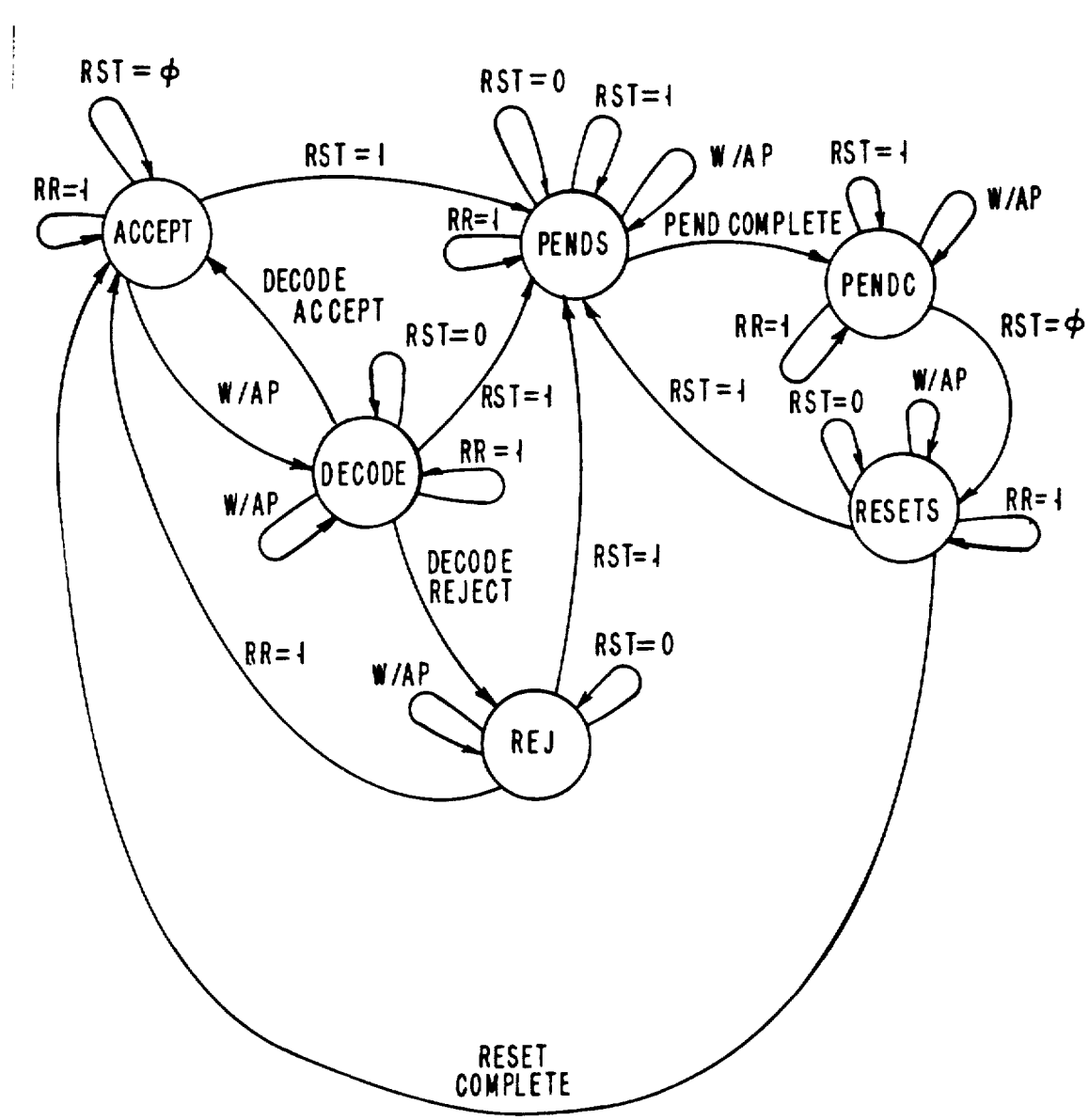
FIG. 13 is a state diagram of the subsystem state transitions during command submission.

With these states and actions, state transitions are defined in the state diagram of FIG. 13.

Results of Host Processor attempts to set I/O Ports.

In the decision table of FIG. 14, the results of host processor attempts to set I/O ports when the subsystem is in various states are summarized. The States are the ones used in the State diagram of FIG. 12. SSCP, means Subsystem Control port.

Explanation of notes in table of FIG. 14.

1. The system setting RST to ONE, places the subsystem into the Reset Pending Started state.

2. If RST is set to ONE, all other bits in the Subsystem Control port are made ZERO by the subsystem as part of entering the Reset Pending Started state.

3. A system write to the Attention Port while the subsystem is the state, Accepting Commands, places the subsystem in the Decode state.

4. The system setting RST to ZERO, while the subsystem is the state Reset Pending Complete, puts the subsystem into the Reset in Progress state.

5. The system setting RR to ONE, while the subsystem is in the Reject State will put the subsystem into the Accepting Commands state, unless the OUT which sets RR, also set RST to ONE. If RST is set to ONE, then the change to RR is ignored, and the subsystem is placed in the Reset Pending Started state. Setting RR to ZERO, while in the subsystem is in the Reject state, will not clear the Reject State.

Command Handling and the Decode Process.

In this section the discussion of the command handling portion focus on the decode process. A decision table relative to accepting commands in the decode process is shown in FIG. 15, and decision tables relative to rejecting commands in the decode process are shown in FIGS. 16, 17 and 18.

The requirement is that a hardware controlled process exist which the subsystem uses to monitor host processor writes to the Command, Attention and Subsystem Control Ports. This process called, the Command Handler, responds to actions like writing RST bit of the Subsystem Control port, by invoking hardware controls to reset the subsystem. The Command Handler also has the responsibility for invoking a process which may be either in hardware or firmware which the subsystem uses to determine whether or not to accept a command submitted through the Attention and Command Ports. The Command Handler invokes this process when the subsystem is in the Accepting Commands State, and a host processor write of the Attention port is detected. The Command Handler places the subsystem into the Decode state, and invokes the Decode Process to determine whether or not it can accept the newly submitted command.

While in the Decode State, the Command Handler is responsible for insuring that host processor attempts to submit a new Command by writing the Command or Attention ports are blocked. The Command Handler also responds to host program writes to the Subsystem Control port to insure that Host Program changes to the RST bit are permitted while the subsystem is in any state. It is this facility which allows a hardware controlled Reset Subsystem to be accepted from the host processor. Other hardware controls are allowed, by the Command Handler depending on the subsystem state.

Since the Decode Process has the task of determining whether or not the subsystem can accept a command directed to a device, it needs to be concerned with the following kinds of data:

Command Type. The attention code for the command determines how a command will be processed. Commands are broken into the following categories: Reset Device, Reset Interrupt, SCB, Immediate Commands. Device Dependent Attention, if it is supported by the implementation will be placed in either the SCB, or Immediate command category, as defined by the implementation. Unsupported attention codes are rejected by the decode process with an Invalid Command Attention codes which are not SCB commands are termed Direct commands.

Device Number. The device to which the command is directed is contained in the attention port. This data is needed in order to determine which device the command is directed to. Using this data, the Decode Process also accesses device state information which allows the subsystem to determine whether or not the new command can be accepted or rejected. An invalid device address causes a command to be rejected.

Command Code. When Direct Commands are being processed, their 8 bit command code in bits 0-7 of the command is examined to determine the command code. An unrecognized 8 bit immediate command code causes the command to be rejected with an Invalid Command.

The Device State. This is the current condition of the device and defines whether or not given the current device state, the command can be accepted. This invention defines a number of states and indicates whether or not a command may be accepted while in a given state. This data is presented in detail in "Decision Tables for the Decode Process" which is discussed later.

When the Decode Process decides to accept a command, it needs to insure that the device state is updated to show that the new command is accepted, and to schedule the device to start executing the new command. The Decode Process must also insure that the Command Handler takes the subsystem from the Decode state, and places it into the Accepting Commands State. This invention does not insist that the resetting of device state, and the scheduling of the new command be performed in the Decode Process, but it is conceptually simpler to think of that being the case.

It is also important to recognize that the Decode Process must cause the required new command to be scheduled for execution at the required device. The word scheduled is used for all commands except Reset Device 0, since the usage of subsystem processor cycles needs to be shared among tasks that are being performing for other devices. In the case of Reset Device 0, this is a special case since the action causes a software invoked reset of the subsystem, and requires that all current subsystem activities for other devices be halted.

When a command is signalled as being accepted, it is the Command Handler which sets the Command Busy/Status port so that the Busy and Reject bits are both ZERO.

When the Decode Process rejects a command, the Command Handler is given the reason for the rejection. The subsystem is moved from the Decode State, to the Reject State. The Busy and Reject bits in the Command Busy/Status port are set to ONE. The S bits in this port are set at the same time as the Reject bit, and contain the encoded value which indicates why the command was rejected.

At the completion of the Decode Process several objectives are met:

An Immediate command accepted by the Decode process, will not interrupt for command rejection at a later time. Unless the hardware fails, the Immediate command will execute correctly after acceptance by the Decode Process.

Any commands which cannot be executed because of current device state are rejected as quickly as possible with no subsystem interrupt. The rejection status and cause of rejection remain available to the host program until explicitly cleared.

Special attention codes like Reset Device are scheduled for execution as quickly as possible.

SCB commands are scheduled for fetching. The decode process does not examine SCBs for valid field values.

The description of how a device reacts when various commands are presented to it is defined in a set of decision tables in "Decision Tables for the Decode Process" which is discussed shortly. As a general summary these rules can be described as follows:

1. A Hardware Controlled Reset Subsystem is always accepted by the subsystem.
2. A Command directed to the Attention port will be ignored by the subsystem if it is the states, Decode in Process, Subsystem Reject, Subsystem Reset in Process, Subsystem Reset Pending Started, or Subsystem Reset Pending Complete.
3. A Reset Device command will be accepted by the device even if the device is busy executing another command. There are three exceptions to this rule.
   The device number specified in the Attention Port is not valid.
   The 8 bit immediate command code in bits 0–7 is not equal to zero.
   The subsystem is in one of the states defined in exception 2 above, that is, it is ignoring any commands which are submitted by a write attempted to the Attention port.
4. When a device is busy executing a command, it will reject a new command with a device busy code except for the following cases:
   command is Reset Device.
   The device is busy executing an SCB, and the new command is Suspend. (In this case the SCB which is executing is allowed to complete before the device is placed in a state where SCB execution has been disabled. A suspend always causes the last SCB executed at the device to request an interrupt.)
   The device is busy executing an SCB, and the new command is Reset SCB Interrupt. (The currently executing SCB is halted immediately, and the Reset SCB Interrupt function is executed. The halted SCB is allowed to continue execution.)
5. When the interrupt queue for a device is full, it will reject a new command except in the following situations:
   Reset Device
   Reset Interrupt (SCB or Immediate)
   Reset Subsystem (Hardware or Software Controlled)
6. When a device is not busy executing a command, it will reject an SCB command if the device has been placed in a state where it cannot execute SCB commands by a prior Suspend command.
7. If the device is in a state where it cannot reliably execute a command, it will reject all commands except:
   Reset Device
   Reset Subsystem (Hardware or Software Controlled.)

If the device address in the Attention Port is not valid, the command is rejected.

Decision Tables for the Decode Process
The Architecture for the Decode Process defines an order in which rejection tests are made so that it specifies which rejection is to be given, when multiple reasons for rejection exist. This is shown in the following table:

Steps in the Decode Process
Causes for Rejection

Step 1 - Validate the Attention Code and the Command. Reject Code = 010

| | |
|---|---|
| Unrecognized Attention Code | Invalid Attention Code |
| Reset, Attention Code (00) | Invalid 8 bit Immediate Command Code |
| Reset Interrupt Attention Code (0E) | Invalid 8 bit Immediate Command Code |
| Immediate Command Attention Code (01) | Invalid 8 bit Immediate Command Code |

Step 2 - Validate Device in Attention Port is valid. Reject Code = 101

| | |
|---|---|
| Reset Device | Invalid device number in Attention Port |
| SCB or Device Dependent Attention as SCB | Invalid device number in Attention Port |
| NOOP Immediate, Suspend, Resume | Invalid device number in Attention Port |
| Diagnose Immediate | Invalid device number in Attention Port |
| Reset Interrupt Status Port | Invalid device number in Attention Port |
| Reset SCB Interrupt | Invalid device number in Attention Port |
| Device Dependent Attention as non-SCB | Invalid device number in Attention Port |
| Immediate Command | Invalid device number in Atention Port |

Step 3 - Validate Device is in Available State. Reject Code = 001

| | |
|---|---|
| SCB or Device Dependent Attention as SCB | Device in unavailable state |
| NOOP Immediate, Suspend, Resume | Device in unavailable state |
| Diagnose Immediate | Device in unavailable state |
| Reset SCB Interrupt | Device in unavailable state |
| Reset Interrupt | Device in unavailable state |
| Status Port | Device in unavailable state |
| Device Dependent Attention as Non-SCB | Device in unavailable state |
| Immediate Command (None of the above) | Device in unavailable state |

Step 4 - Validate that Device is Not Busy Reject Code = 011

| | |
|---|---|
| SCB or Device Dependent Attention as SCB | Device is Busy |
| NOOP Immediate, Resume, Diagnose Immediate | Device is Busy |
| Reset Interrupt Status Port | Device is Busy |
| Reset SCB Interrupt, Suspend | Device Busy, (Not executing an SCB) |
| Device Dependent Attention as Non-SCB | Device Busy |
| Immediate Command (None of the above) | Device Busy |

Step 5 - Validate Device Interrupt Queue Not Full Reject Code = 111

| | |
|---|---|
| SCB or Device Dependent Attention as SCB | Interrupt Queue Full |
| Resume, Suspend, NOOP | Interrupt Queue |

-continued

Decision Tables for the Decode Process
The Architecture for the Decode Process defines an order in which rejection tests are made so that it specifies which rejection is to be given, when multiple reasons for rejection exist. This is shown in the following table:

| Steps in the Decode Process | |
|---|---|
| Causes for Rejection | |
| Immediate | Full |
| Diagnose Immediate | Interrupt Queue Full |
| Device Dependent | Interrupt Queue |
| Attention as Non-SCB | Full |
| Immediate Command (None of the above) | Interrupt Queue Full |
| Step 6 - Validate SCB Execution Enable Reject Code-100 | |
| SCB or Device Dependent Attention as SCB | SCB Execution disabled by Suspend |

The decode Architecture is fully defined first by specifying a detailed Device and Subsystem state, and then by a set of decision tables.

Subsystem and Device State Definitions:

The Subsystem has the following State components:
Subsystem Execution States are: ACCEPT, PENDS, PENDC, RESETS, REJECT, DECODE. These states define whether or not the subsystem can accept a new command or hardware control.

Available State. Defines whether or not the subsystem has entered a state where it can be expected to reliably execute a command. If its values are YES, the subsystem is available, or NO, it is not.

DMA Enable. This state component indicates whether or not DMA activity is allowed for the subsystem, YES or NO. When DMA activity is not allowed, no fetching of SCB commands, storing of TSB status, or data movement for SCB commands is permitted for the subsystem. This component corresponds to the DMA bit in the Subsystem Control port.

Interrupt Enable. This state component indicates whether or not the subsystem is enabled to send a physical interrupt to the main processor when a command requires an interrupt. It corresponds to the EI bit in the Subsystem Control Port. When the value is YES, a physical interrupt may be signaled. When the value is NO, then an interrupt will not be signalled.

IV valid. This state component corresponds to the IV bit in the Command Busy/Status port. If its value is YES, then the Interrupt Status port for the subsystem has a valid interrupt value in it which has not been reset by the host program. If the value is NO the Interrupt Status Port is clear of any interrupt value.

Any Device Active. This state component is used by the subsystem to determine how to resume processing after it has processed a request from the host processor to handle either a hardware control, or a command submitted through the Attention port. For example, a write to the RR bit when the subsystem is in the ACCEPT state, and this component is YES, means that the subsystem should return to the activity it was performing before the RR bit was set. If the value of this component is NO, then the subsystem has no device activity to perform, and is placed in a state waiting for the next main processor action to occur.

Device State

A device is defined to have the following state components.

1. Busy State. This defines whether or not the device is currently busy executing a command. This state has two values, BUSY, or IDLE. If the value is IDLE, the device is not currently executing any command. If the value is BUSY, then the device is executing a command, and the Busy Substate, and CMD states will further define the command or hardware control in progress at the device.

2. Busy Substates. If a device is busy executing a command this state component indicates the type of command in progress as follows: Immediate Command, SCB, Reset Subsystem (Hardware Controlled), Reset Subsystem (Software Controlled), Reset Device, Suspend, Reset SCB Interrupt.

When the Busy Substate is Immediate Command or SCB, then the CMD field defines the explicit command which will be executed at the device.

When the Busy Substate is Reset Subsystem (Hardware Controlled), Reset Subsystem (Software Controlled), Reset Device, Suspend, or Reset SCB Interrupt, then the CMD state component indicates the command which is in execution at the device when one of these commands is accepted.

When the Busy Substate is Reset Subsystem (Hardware Controlled), Reset Subsystem (Software Controlled), Reset Device, Suspend, or Reset SCB Interrupt, the device state component OLD Busy Substate contains the Busy Substate active when one of these commands is accepted.

When the Busy state of the device is IDLE, the Busy Substate component will be Undefined for the device.

3. CMD State. This gives details on the command being executed at the device as follows: If the Busy Substate of the device is Immediate Command this gives the command which is in execution at the device. In this case its values are:
Run Diagnostic Test Immediate
NOOP Immediate
Reset Interrupt Status Port
Immediate Command
If the Busy Substate was SCB, then the CMD states are:
Fetch next SCB from host processor memory for single SCB.
Fetch next SCB from host processor memory for element of SCB chain.
Validate single SCB. (Perform specification test of SCB).
Validate SCB chain element. (Perform specification test of SCB).
Execute Single SCB
Execute SCB Chain Element
These CMD states are set by the device task as it executes an SCB. That is, the Command state progresses from Fetch SCB to Execute Single SCB or Execute SCB Chain element. When a single SCB is executing, the device moves to the Idle state when the SCB completes execution. When a Device is executing an SCB chain, it progresses through the Fetch and execute SCB Command states until the chain is complete or SCB execution is suspended by a Suspend command. A Suspend Command will always force the device to the Idle State when the Suspend action is completed.

If the Busy Substate for the device is equal to Reset Subsystem (Hardware Controlled), Reset Subsystem (Software Controlled), Reset Device, Suspend, or Reset SCB Interrupt the usage of the CMD field depends upon the state component OLD Busy Substate. If the value is Immediate command or SCB, then the CMD field reflects the command that was active when Reset Subsystem, Reset Device, Suspend or Reset SCB interrupt was accepted for execution. If the Old Busy Substate of the Device is Reset Subsystem (Hardware or Software Controlled Reset Device, Suspend, or Reset SCB interrupt the CMD is ignored, since the command active at acceptance is defined completely by the state component Old Busy Substate.

4. Device Interrupt Queue Full or Interrupt Queue Full. This state component indicates whether or not the Interrupt Queue Space for the device is full. A value of YES, indicates that the queue is currently full. A value of NO indicates that the device interrupt queue has space available in it. Interrupt queue space is allocated when an interrupt is queued by the device, the interrupt queue can become full at that point.

5. SCB Execution Enablement or SCB Exec Enable. This state component indicates whether or not SCB execution is allowed by the device. If SCB execution has not been allowed, this component is NO. This is caused by the execution of a Suspend command. If SCB execution is allowed, the value of the component is YES. It is set YES by Resume, Reset Device or Subsystem.

6. SCB Chain Suspended or Chain Suspended. The value of this state is only valid when a Suspend was issued against the device. If a suspend was issued, and the Fetching of the next SCB in a chain was stopped by a Suspend, the value of this component is YES. This means that a Resume issued to a device in this state will cause the device to re-enter the SCB Busy Substate, and to resume execution of the suspended chain using the SCB address saved at the time of the Suspend Command in SCB Fetch Address. If a Suspend was issued when an SCB chain was not active, or if the Chain was halted by the completion of the current SCB, then the value of this component will be NO. A Resume issued to a device in this state will not cause the device to re-enter the SCB Busy Substate it will exit Resume to the Idle state.

7. SCB Fetch Address. When an SCB command is initially accepted by a device, the address in the Command port is moved to this area by the Decode Process. When the next SCB in a chain is to be fetched by the device task, this state component is updated with the address of that SCB. The device task decides which chain address to select from the SCB depending on the ending state of the SCB.

8. Device Available or Device Avail. If the device is a state where it can reliably execute command, this state, component has a value of YES. If the device is in a state where it cannot reliably execute a command, then this state value is NO.

9. Immediate Command value or IC. When the Decode Process accepts a Direct command, then the value in the Command port is moved to this state component. It can be used by the device task to access the values in the Direct command. Currently only Bits 15-0, effect the execution of a Direct command.

10. Device Interrupt Enablement. This state component determines whether or not a device is enabled to request a physical interrupt. If the value of the component is ENABLE an interrupt can be requested. If the value is DISABLE no physical interrupt can be requested. A device is always required to queue an interrupt in the device's internal interrupt queue independently of the value of this component. The component is set either by bit 14 of an immediate command which is sent to the device or a Reset Subsystem.

11. Interrupt After. This state component determines whether or not an immediate command will request an interrupt on successful completion. It is ignored for Reset Subsystem, Reset SCB Interrupt, and Reset Immediate Interrupt. The component has the values YES or NO and is set by bit 15 of an immediate command directed to the device.

12. Old Busy substate. This state component contains the Busy Substate value which was active at the device when a Suspend, Reset Subsystem (Software Controlled), Reset Device, Reset Subsystem (Hardware Controlled), or Reset SCB Interrupt is accepted.

13. Old CMD state. This state component contains the SCB CMD value which is active when an SCB could not be fetched because the device had a full interrupt queue. The device is placed in the IDLE state when this condition arises. A Reset SCB Interrupt or Reset Immediate Interrupt can cause the device to re-enter the SCB state if the interrupt queue is not full after execution.

14. SCB suspend Interrupt Queue Full. This state component has the value YES if the device is taken from SCB state and placed in the IDLE state because the device's interrupt queue was full. The state component Old CMD State, and SCB Fetch Address are used to re-start SCB execution when a Reset Interrupt causes the device's interrupt queue to exit the full state when this state component is equal to YES. The component has a value of NO, when the device is not in a state where SCB execution is suspended because its interrupt queue is full.

15. Reset SCB Interrupt Accepted While Executing SOB. This state component is equal to YES when a Reset SCB Interrupt Command is accepted by a device busy executing an SCB. This value is equal to NO, when a Reset SCB Interrupt is accepted when the device is in the IDLE state.

16. Interrupt Queue for the Device. This is the state component which locates the internal interrupt queue for the device. It has to include the location of the current oldest element, and the location and number of entries available to allocate for later interrupts.

17. The SCB Logical Interrupt Count. This is the state component which is incremented by one every time the device raises an SCB logical interrupt.

Using some of these State Components a Command is accepted or rejected by the Decode Process as indicated in the decision tables of FIGS. 15, 16, 17 and 18. Within these tables the notation DC means Don't Care, and the condition is not tested to determine the outcome of the Decode Process. The notation NA means Not Applicable, and means that the condition cannot exist as part of the testing needed in the Decode Process.

The command delivery system includes a command handler and a decode processor. These functions may be implemented in hardware and/or software. Accordingly, their implementation is shown in flow chart form in FIGS. 19-25 to complement the earlier block diagram implementations utilized in FIGS. 2 and 12 explaining system operation. Specifically, the Command handler and decode processor are included and exemplified in hardware form in the command delivery logic 230 and microprocessor 234 of subsystem 202 in FIG. 12. The command handler processes the commands received at the I/O ports, and the decode processor decodes the commands for execution by the subsystem or one of the attached devices.

FIG. 19 is an overview flow chart of the command delivery system. The command handler is entered on an interrupt, when the subsystem detects a host processor write to any of the following I/O addresses: Subsystem Control Port (SSCP), Attention Port (AP), or Command Interface Port (CP), as indicated at block 500. As indicated at block 502, if the command handler is able to do so, it disables any interruptions of its processing for host processor writes to the Command Interface and Attention Ports. If such interruptions cannot be disabled, then writes to these ports are ignored until the command handler is re-enabled later in its processing. At decision block 504 a determination is made relative to whether the command handler was entered as a result of an attempt to write to the SSCP. If so, the logic proceeds to block 506 to process the write to the SSCP. This process is described in detail relative to FIG. 20 and FIG. 21. After the write to SSCP the logic proceeds to block 508 where the command handler re-enables processing for host processor writes to the attention and command interface ports by looping back to block 500.

If at decision block 504 there is not a write to the SSCP, proceed to decision block 510 to determine if the host computer attempted to write to the Command Interface port. If so, the logic proceeds to block 512 to process the write to the Command Interface port. This process is described in detail relative to FIG. 23. After the write to the Command Interface port the logic once again proceeds to block 508 where the command handler re-enables processing for host processor writes to the attention port by looping back to block 500.

If at decision block 510 there was not a write to the Command Interface port, proceed to block 514 to process the write to the Attention port. This process is described in detail relative to FIG. 22.

Figure 20A:
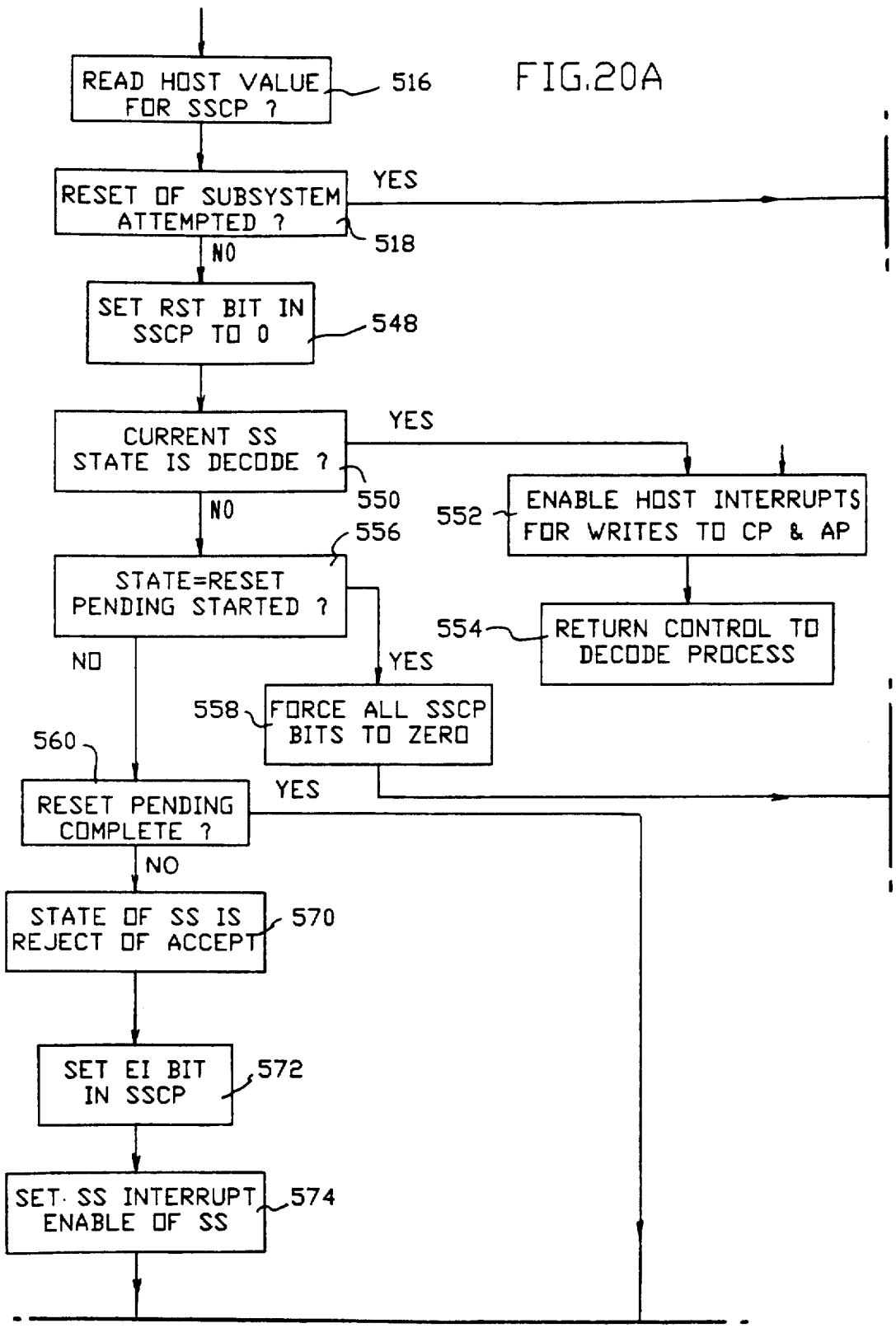
FIG. 20A, 20B and 20C taken together as shown in FIG. 20, and FIG. 21 are detailed flow charts of the process write to the subsystem control port, which is shown generally in FIG. 19.
Figure 20:
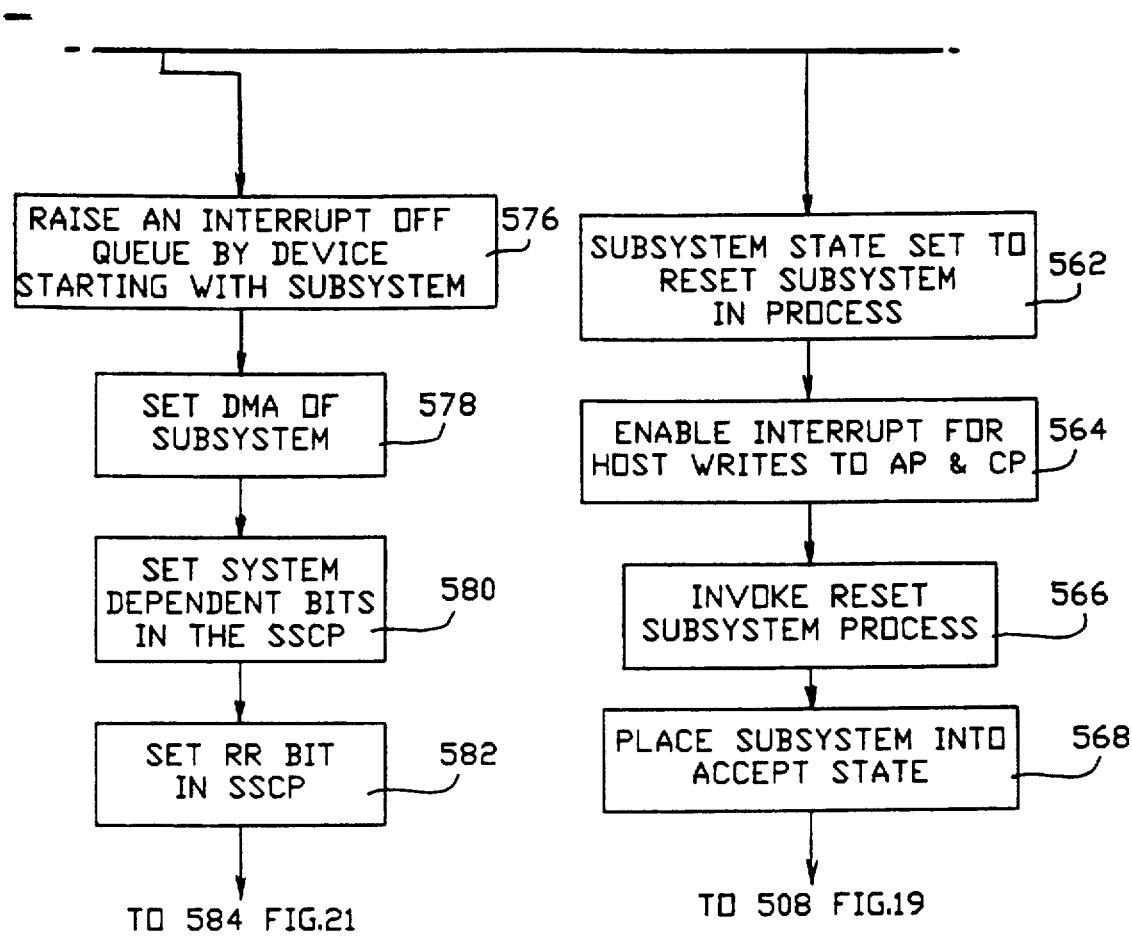
Figure 20:
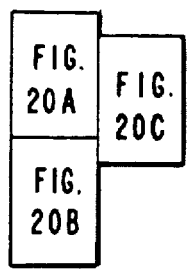

A detailed description of block 506 of FIG. 19, the processing of a write to SSCP, follows with respect to FIG. 20 and FIG. 21. With respect to FIG. 20, the host processor value written to the SSCP is read as indicated at block 516. At block 518 a determination is made whether or not a reset of the subsystem has been attempted. If so, proceed to block 520 where the RST bit in the SSCP is set to 1. Proceed to decision block 522 where a determination is made whether or not the subsystem execution state is accepting commands. If so, the subsystem state is set to subsystem reset pending started as indicated at block 524. The subsystem hardware function to execute subsystem reset pending is then invoked as indicated at block 526. On completion of the hardware function to execute the subsystem reset pending function, the subsystem execution state is set to subsystem reset pending complete as indicated at block 528. A return is then made to block 508 of FIG. 19 to enable host interrupts as previously explained.

If at decision block 522 a determination is made that the subsystem execution state is not accepting commands proceed to decision block 530 to determine if the subsystem execution state is subsystem reset pending started. If so, proceed to block 532 to re-enable host processor writes to the Command Interface and Attention ports. The command handler then returns control to the hardware process which is executing the reset pending function as indicated at block 534.

If at decision block 530 a determination is made that the subsystem execution state is not subsystem reset pending started, proceed to decision block 536 to determine if the subsystem execution state is subsystem reset pending complete. If so, a return is made to block 508 of FIG. 19 to enable host interrupts as previously explained. If not, proceed to decision block 538 to determine if the subsystem execution state is reject. If so, proceed to block 524 to place the subsystem in the reset pending started state, and proceed as previously explained. If not, proceed to decision block 540 to determine if the subsystem execution state is equal to decode. If so, proceed to block 542 where the execution of the decode process which was underway when the host computer set RST to 1 is aborted. Proceed to block 524 to place the subsystem in the reset pending started state, and proceed as previously explained. If the subsystem execution state is not equal to decode at decision block 540, proceed to block 544 where the current subsystem execution state is subsystem reset in process. RST is set to 1 causing the subsystem to abort the reset in process state as indicated at block 546. Proceed to block 524 to place the subsystem in the reset pending started state, as previously explained.

If at decision block 518 a determination is made that there was not an attempt being made to reset the subsystem, proceed to block 548 where the RST bit of the SSCP is set to 0. Proceed to decision block 550 where a determination is made if the execution state of the subsystem is decode. If so, proceed to block 552 where the Command Handler re-enables processing for host processor writes to the Command and Attention ports. The Command Handler then returns control to the decode process as indicated at block 554.

If at decision block 550 a determination is made that the execution state of the subsystem was not decode, proceed to decision block 556 to determine if the subsystem execution state is reset subsystem pending started. If so, proceed to block 558 to force all SSCP bits to 0 except the RST bit. Next proceed to block 532 to enable writes to the Command Interface and Attention ports, and proceed as previously explained.

If at decision block 556 a determination is made that the subsystem execution state is not reset subsystem pending started, proceed to decision block 560 where a determination is made if the subsystem execution state is reset pending complete. If so, proceed to block 562 where the subsystem execution state is set to reset subsystem in process. At block 564, the Command Handler re-enables processing of host processor writes to the Command Interface and Attention ports. The Command Handler then calls the reset subsystem in process function as indicated at block 566. At this time, the subsystem execution state is ready to accept commands as indicated at block 568. A return is then made to block 508 of FIG. 19 to enable host interrupts as previously explained.

If at decision block 560 a determination is made that the subsystem execution state is not reset pending complete, proceed to block 570 where the subsystem execution is reject or accept. At block 572 bit zero of the SSCP is set to the EI bit of the SSCP. The interrupt enable component of the subsystem execution state is set to YES as indicated at block 574. The test interrupt function is invoked at block 576 to determine if any device, starting with device 0 can raise an interrupt. Bit one of the SSCP is set into the DMA of the subsystem control port as indicated at block 578. Bits 6, 4, 3 and 2 of the SSCP are set in the corresponding positions in the SSCP as indicated at block 580. Bit 5 of the SSCP is set into the RR bits of the SSCP as indicated at block 582.

The process write to SSCP is continued on FIG. 21 at decision block 584 where a determination is made whether or not the RR bit in the SSCP equals ZERO. If so, proceed to decision block 586 where a determination is made whether or not the subsystem execution state is accept command. If so, proceed to decision block 588 where a determination is made whether or not any device active component of the subsystem is equal to NO. If so, proceed to block 508 of FIG. 19 to enable host interrupts as previously explained. If any device active components is equal to YES, proceed to block 590 where the Command Handler re-enables processing of host processor writes to the Command Interface and Attention ports. At block 592, the Command Handler returns from handling its actions to return control to the interrupted activity on the subsystem.

If at decision block 586 the determination is made that the subsystem execution state is not accepting commands, proceed to decision block 594 where a determination is made whether or not the subsystem execution state is reset system in process. If so, proceed to block 596 where the Command Handler re-enables processing of host processor writes to the Command interface and Attention ports. The Command handler then returns from the interrupt to the reset subsystem in process function as indicated at block 598.

If at decision block 594 a determination is made that the subsystem execution state is not reset in process, proceed to decision block 588 and proceed as previously explained.

If at decision block 584 a determination is made that the RR bit is not equal to ZERO, proceed to decision block 600 where a determination is made whether or not the subsystem execution state is equal to reject. If so, proceed to block 602 where the subsystem is taken from the reject state and placed in the accept commands state. Next proceed to decision block 588 and proceed as previously explained. If at decision block 600 a determination is made that the subsystem execution state is not equal to reject, proceed to decision block 588 and proceed as previously explained.

A detailed description of block 514 of FIG. 19, the processing of a write to the Attention port, follows with respect to FIG. 22. At decision block 604 a determination is made whether or not the subsystem execution state is equal to decode. If so, the host processor write to the Attention port is ignored as indicated at block 606, and a return is made to block 552 of FIG. 20A to proceed as previously explained. If a determination is made at decision block 604 that the subsystem execution state is not equal to decode, proceed to decision block 608 where a determination is made whether or not the subsystem execution state is equal to reject. If so, the host computer write to the Attention port is ignored as indicated at block 610, and a return is made to block 588 of FIG. 21 to proceed as previously explained.

Figure 20C:
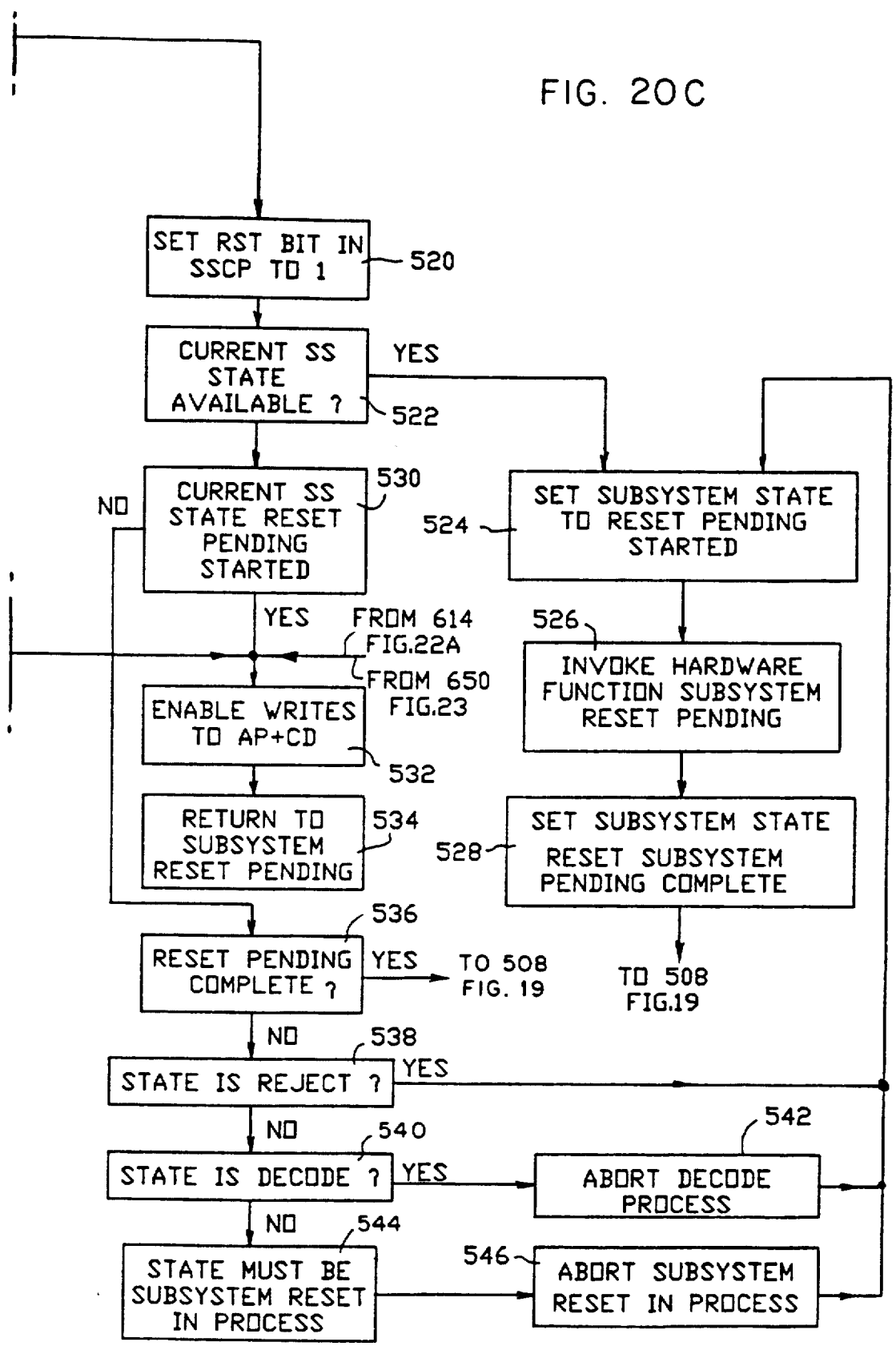

If a determination is made at decision block 608 that the subsystem execution state is not equal to reject, proceed to decision block 612 where a determination is made whether or not the subsystem execution state is equal to reset pending started. If so, the host computer write to the Attention port is ignored as indicated at block 614, and a return is made to block 532 of FIG. 20C to proceed as previously explained.

If a determination is made at decision block 612 that the subsystem execution state is not equal to reset pending, proceed to decision block 616 where a determination is made whether or not the subsystem state is equal to reset pending complete. If so, the host computer write to the Attention port is ignored as indicated in block 618, and a return is made to block 508 of FIG. 19 to enable host interrupts as previously explained.

If a determination is made at decision block 616 that the subsystem execution state is not equal to reset pending complete, proceed to decision block 620 where a determination is made whether or not the subsystem execution state is equal to reset subsystem in process. If so, the host computer write to the attention port is ignored as indicated in block 622, and a return is made to block 596 of FIG. 21 to proceed as previously explained.

If a determination is made at decision block 620 that the subsystem execution state is not equal to reset subsystem in process, proceed to block 624 where the subsystem execution state is in the accept state, and the Attention port is updated at block 626. The subsystem execution state is then set to decode as indicated at block 628. The Command Handler then invokes the decode process in block 630, the details of which are described subsequently, relative to FIGS. 24 and 25.

At decision block 632 a determination is made whether or not the decode process accepted the command. If so, proceed to lock 634 where the subsystem execution state is set to accepting commands, and a return is made to decision block 588 of FIG. 21 to proceed as previously explained.

If a determination is made at decision block 632 that the decode process had not accepted the Command, proceed to block 636 where the subsystem execution state is set to reject. In block 638 the B bit and REJ bit are set to 1 and the S bits are set as determined by the decode process in the Command/Busy Status port. A return is then made to decision block 588 of FIG. 21 to proceed as previously explained.

Figure 23:
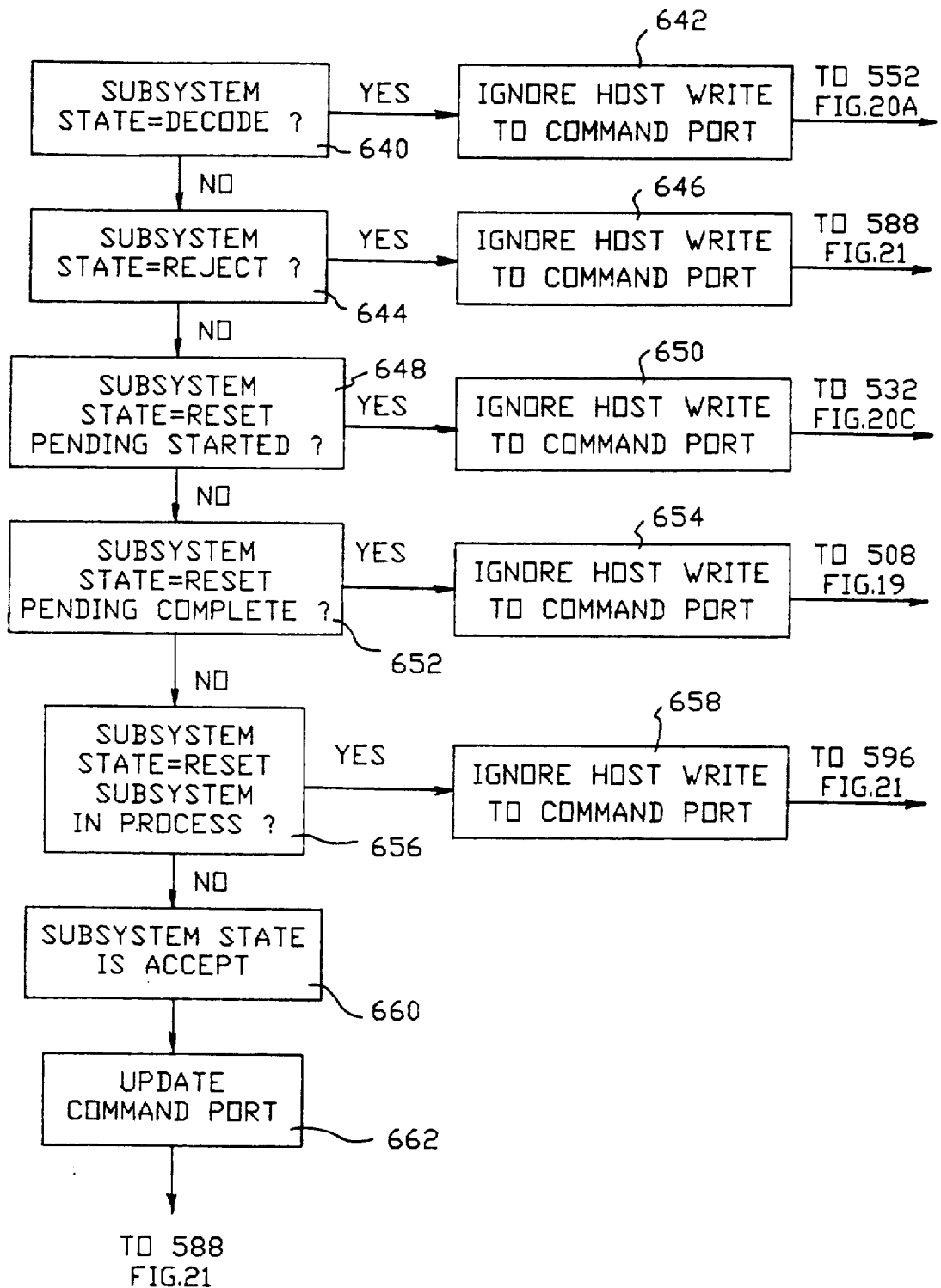
FIG. 23 is a detailed flow chart of the process write to the command interface port which is shown generally in FIG. 19.

A detailed description of block 512 of FIG. 19, the processing of a write to the Command Interface port, follows with respect to FIG. 23. At decision block 640 a determination is made whether or not the subsystem execution state is equal to decode. If so, the host computer write to the Command Interface port is ignored as indicated at block 642, and a return is made to block 552 of FIG. 20A to proceed as previously explained. If a determination is made at block 640 that the subsystem execution state is not equal to decode, proceed to decision block 644 where a determination is made whether or not the subsystem execution state is equal to reject. If so, the host computer write to the Command Interface port is ignored as indicated at block 646, and a return is made to block 588 of FIG. 21 to proceed as previously explained.

If a determination is made at decision block 644 that the subsystem execution state is not equal to reject, proceed to decision block 648 where a determination is made whether or not the subsystem execution state is equal to reset pending started. If so, the host computer write to the Command Interface port is ignored as indicated at block 650, and a return is made to block 532 of FIG. 20C to proceed as previously explained.

If a determination is made at decision block 648 that the subsystem execution state is not equal to reset pending started, proceed to decision block 652 where a determination is made whether or not the subsystem execution state is equal to reset pending complete. If so, the host computer write to the Command Interface port is ignored as indicated in block 654, and a return is made to block 508 of FIG. 19 to proceed as previously explained.

If a determination is made at decision block 652 that the subsystem execution state is not equal to reset pending complete, proceed to decision block 656 where a determination is made whether or not the subsystem execution state is equal to reset subsystem in process. If so, the host computer write to the Command Interface port is ignored as indicated at block 658 and a return is made to block 596 of FIG. 21 to proceed as previously explained.

If a determination is made at decision block 656 that the subsystem execution state is not equal to reset subsystem in process proceed to block 660 where the subsystem execution state is in the accept state. The Command Interface port is then updated by the value provided by the host computer as indicated at block 662. A return is then made to decision block 588 of FIG. 21 to proceed as previously explained.

The Decode Process is invoked by the Command Handler using a "a call like" process to determine whether or not a command can be accepted. If the command is accepted, the Decode Process schedules a device task to execute the command after it returns control to the Command Handler indicating whether or not a Command was Accepted or Rejected. The Decode process sets the device state accordingly if a command is Accepted for execution. If a command is Rejected, the Decode Process returns the value which the Command Handler writes as the S bit values in the Command/Busy Status port.

The Decode Process is entered with a call from the Command Handler. On entry the Command to be processed is available in the Command Interface port. The Attention port contains the command type, and identifies the device to which the command is directed.

Figure 24A:
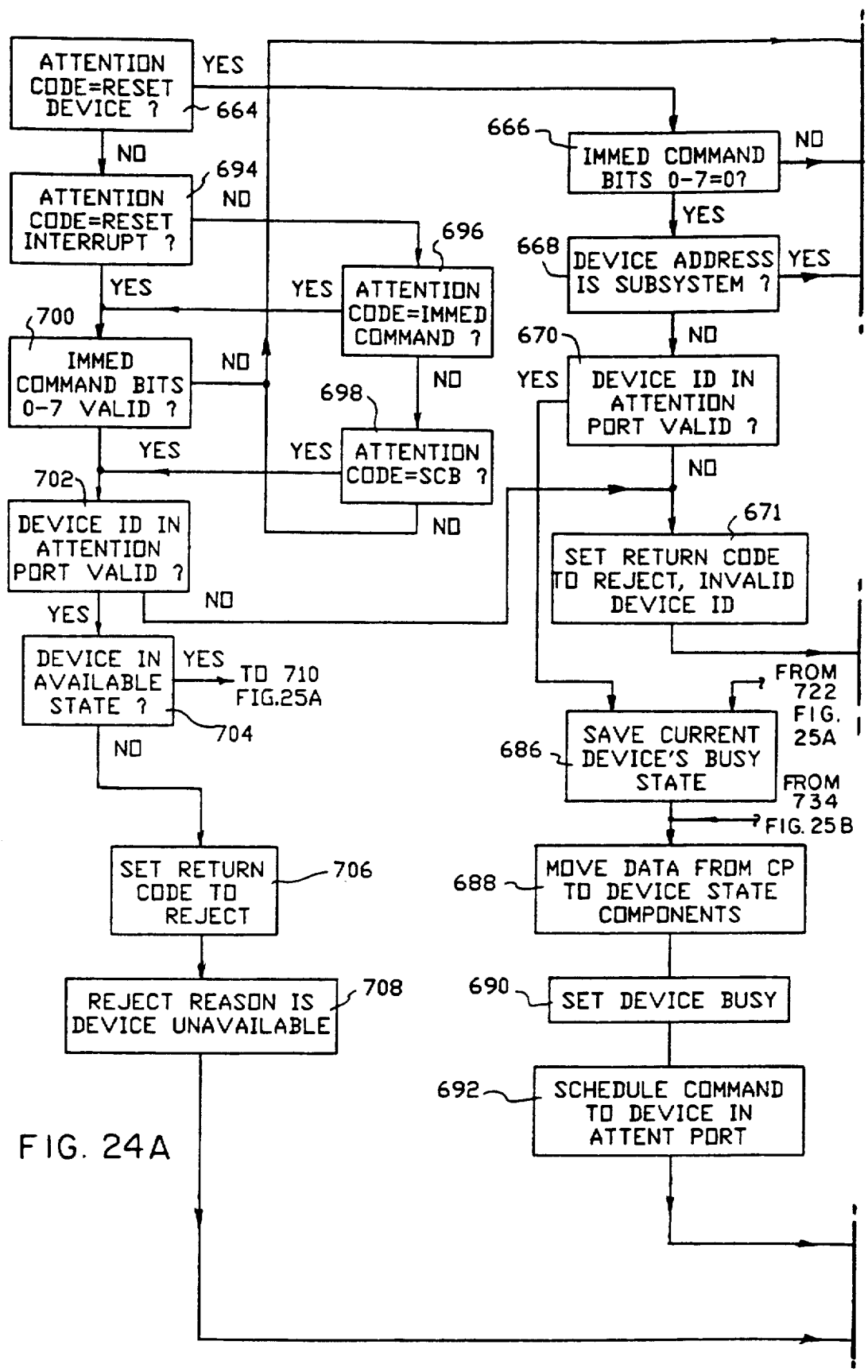
FIG. 24A and 24B when taken together as shown in FIG. 24, and FIGS. 25A and 25B taken together as shown in FIG. 25 are detailed flow charts of the command decode process.
Figures 24, 24B:
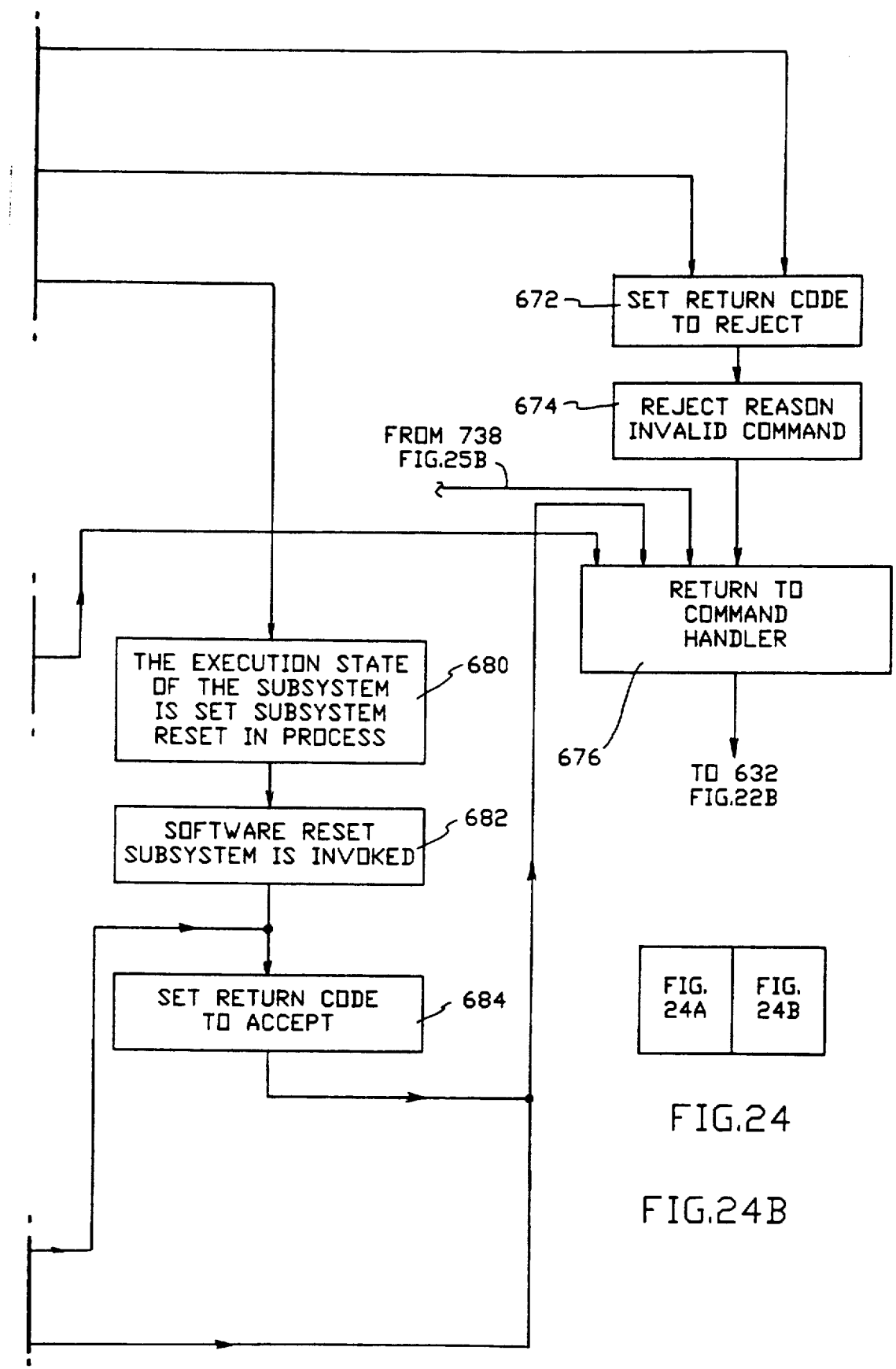
Figure 25B:
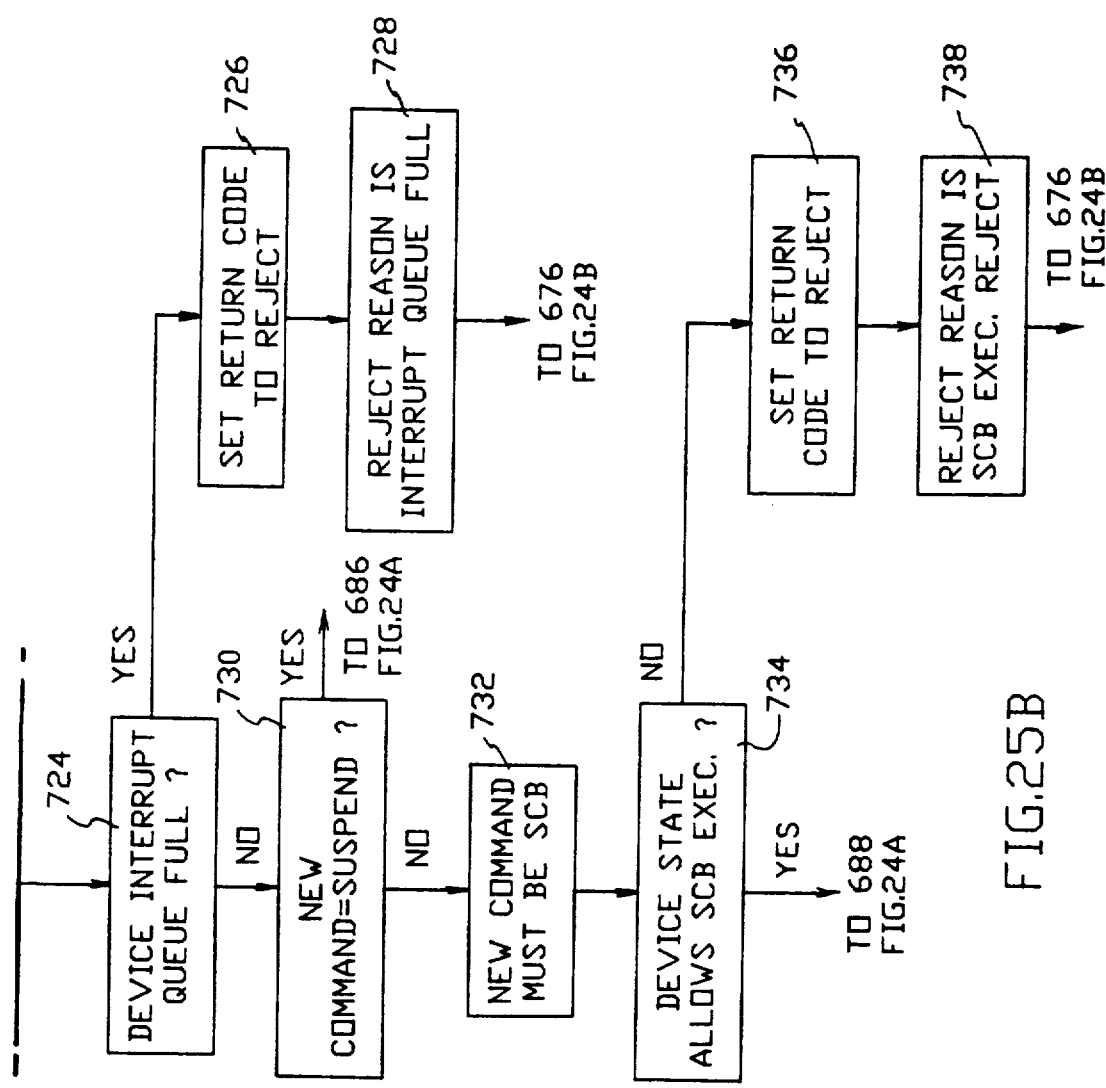

A detailed description of the decode process follows, with reference to FIGS. 24 and 25. At decision block 664 a determination is made whether or not the Attention code for the command is reset device. If so, proceed to decision block 666 to determine if the immediate Command Code in bits 7-0 of the Command Interface port are equal to zero. If not, proceed to block 672 where the decode process sets its return code to indicate the command is rejected. This also occurs if the answer is NO from decision block 698 or 700, the operation of which is to be explained shortly. The reason for the rejection is an invalid command as indicated at block 674. The decode process returns control to the Command Handler at block 676. A return is then made to decision block 632 of FIG. 22B to proceed as previously explained.

If at decision block 666 the determination is made that the immediate Command Code in bits 7-0 of the Command Interface Port are equal to zero, proceed to decision block 668 where a determination is made if the device accessed is address "0", that is the subsystem address, then the Command is a software controlled reset subsystem. If so, proceed to block 680 where the execution state of the subsystem is set to subsystem reset in process. The reset subsystem software controlled function is invoked by the decode process at block 682. The decode process sets its return code as command accept at block 684, and a return is made to block 676 to return to the Command Handler.

If at decision block 668 a determination is made that the device address is not address "0", the subsystem address, proceed to block 670 where the determination is made whether or not the device ID in the Attention Port is valid. If so, proceed to block 686 where the current busy substate of the device to which the command is directed is saved in the device state component OLD Busy Substate. An internal variable IBSS is set to the value reset device. In block 688 the device state component IC of the device to which the command is directed is set to the value in the Command Interface port. The busy state of the addressed device is then set to busy in block 690. The subsystem schedule function is then invoked in block 692 to schedule the command ICMD to the addressed device for later execution. A return is then made to block 684 to proceed as previously explained.

If at decision block 670 the determination is made that the device ID in the Attention Port is not valid, proceed to block 671 where the return code of the Command is set to reject, with the reason being an invalid device ID. Proceed next to block 676 to return to the Command Handler.

If at decision block 664 the determination is made that the attention code for the command is not reset device, proceed to decision block 694 where the determination is made whether or not the attention code for the command is equal to reset interrupt. If not, proceed to decision block 696 to determine if the attention code for the new command is an immediate command. If so proceed to decision block 700, to be described shortly; if not, proceed to decision block 698 where a determination is made whether or not the attention code for the new command is an SCB. If so, proceed to decision block 702, to be described shortly; if not, proceed to block 672 and proceed as previously explained.

If at decision block 694 a determination is made that the attention code for the command is equal to reset interrupt, proceed to decision block 700 where a determination is made whether or not the immediate command code in bits 7-0 of the command in the Command Interface port is valid. If the command is not valid proceed to block 672 and proceed as previously explained. If the command is valid proceed to decision block 702 where a determination is made if the device ID in the Attention Port is valid. If not, proceed to block 671 and proceed as previously explained. If so, proceed to decision block 704 where a determination is made as to whether or not the device is in an available state. If not, proceed to block 706 where the return code is set to reject. The specific rejection code is device unavailable as indicated in block 708. A return is then made to block 676 to proceed as previously explained.

If at decision block 704 a determination is made that the device is in the available state, refer now to FIG. 25A and proceed to decision block 710 where a determination is made whether or not the device is in the busy state. If so, proceed to decision block 712 where a determination is made whether or not the new command is reset interrupt. If not, proceed to decision block 714 to determine if the new command is suspend. If not, set the return code to reject in block 716, with the reason being the device is busy as indicated in block 718. A return is then made to block 676 of FIG. 24B to proceed as previously explained.

If at either decision block 712 or 714 the decision is YES, proceed to decision block 720 where a determination is made whether or not the device is currently executing a SCB. If not, return to block 716 and proceed as previously explained. If so, proceed to decision block 722. If a determination is made at decision block 710 that the device is not busy, the logic also proceeds to decision block 722. At decision block 722 a determination is made whether or not the attention code for the new command is reset interrupt. If so, a return is made to block 686 of FIG. 24A. If not, proceed to decision block 724 where a determination is made whether or not the device interrupt queue is full. If so, the decode process sets its return code to reject in block 726. The specific rejection code is interrupt Queue full as indicated in block 728. A return is made to block 676 of FIG. 24B to proceed as previously explained.

If at decision block 724 a determination is made that the device interrupt queue is not full, proceed to decision block 730 where a determination is made whether or not the new command is suspend. If so, return to block 686 of FIG. 24A and proceed as previously explained. If not, the new command must be a SCB as indicated at block 732. Next, at decision block 734 a determination is made whether or not the device state allows the SCB to execute. If so, return to block 688 of FIG. 24A and proceed as previously explained. If not, the return code is set to reject in block 736. The reject reason is SCB execute reject in block 738. A return is made to block 676 of FIG. 24B to proceed as previously explained.

In summary, a command interface has been described for transferring information between a host computer and at least one intelligent subsystem that may have attached devices. The information transferred from the host processor includes direct commands and indirect commands such as the addresses of Subsystem Control Blocks (SCB's) which contain parameters to specify operations to be performed by the identified one intelligent subsystem or device. The information transferred from the one intelligent subsystem to the host processor includes busy signals which are indicative of whether or not the one intelligent subsystem Command Interface or Attention ports are busy, and status signals which are indicative of the operational status of the one intelligent subsystem and the attached devices.

Having thus described our invention, what we claim as new, and desire to secure by Letters Patent is:

1. A method of operating a computer system which includes a host processor and at least one subsystem which may have attached devices, and a command interface for transferring information between said host processor and said one subsystem, with said command interface including a Command Interface port which is in an active state when receiving commands from said host processor, an Attention port which is in an active state when receiving a code from said host processor which is indicative of which one of said one intelligent subsystem or a device is receiving the command at said command interface port, a command busy/status port which includes a busy bit position and a reject bit position, and a subsystem control port which includes a subsystem reset bit position, and a reset reject state bit position, said method including the steps of:

setting the busy bit position of said command busy/status port to an ON state in response to said Attention port being active, or the subsystem reset bit position of said subsystem control port being in the ON state; and setting the reject bit position of said command busy/status port to an ON state in response to the reset bit position of said subsystem control port being in the ON state, or the reset reject state bit position of said subsystem control port being in the ON state.

* * * * *